United States Patent [19]
Tanaka et al.

[11] Patent Number: 5,354,542
[45] Date of Patent: Oct. 11, 1994

[54] MOVABLE TANK TYPE MULTI-PURPOSE BATCH PRODUCTION SYSTEM

[75] Inventors: Kazuo Tanaka, Yokohama; Kaneo Masuda, Yachiyo; Mituo Eziri, Yotsukaido; Mamoru Sindome, Yokohama; Yositomo Hujiwara, Tokyo; Tomohiro Kiyoda, Takatsuki, all of Japan

[73] Assignee: Asahi Engineering Co., Ltd., Osaka, Japan

[21] Appl. No.: 956,876

[22] PCT Filed: Apr. 22, 1991

[86] PCT No.: PCT/JP91/00531
§ 371 Date: Dec. 10, 1992
§ 102(e) Date: Dec. 10, 1992

[51] Int. Cl.$^5$ .............. B01J 8/00; B01J 10/00
[52] U.S. Cl. .................. 427/187; 15/56; 99/371; 422/188; 422/236; 422/237
[58] Field of Search .......... 99/371, 367, 370; 414/222, 525.1; 15/56, 104.096; 422/187–188, 236–237

[56] References Cited

U.S. PATENT DOCUMENTS

| | | |
|---|---|---|
| 3,264,675 | 8/1966 | Di Ilio ........................ 15/56 X |
| 3,302,791 | 2/1967 | Assalini et al. ............ 422/188 X |
| 3,796,327 | 3/1974 | Meyer et al. .................... 414/222 |
| 4,057,871 | 11/1977 | Heydorn . |
| 4,091,941 | 5/1978 | Hammarqvist .......... 414/525.1 X |
| 4,711,342 | 12/1987 | Abraham ................ 414/525.1 X |
| 5,007,783 | 4/1991 | Matsuo .......................... 414/222 |
| 5,183,368 | 2/1993 | Donard .......................... 414/222 |

FOREIGN PATENT DOCUMENTS

| | | |
|---|---|---|
| 60-186572 | 9/1985 | Japan . |
| 61-8264(A) | 1/1986 | Japan . |
| 61-287970 | 12/1986 | Japan . |
| 62-144745 | 6/1987 | Japan . |
| 1-180249(A) | 7/1989 | Japan . |
| 1-39697 | 8/1989 | Japan . |
| 2-16170 | 1/1990 | Japan . |
| 2-54877 | 2/1990 | Japan . |
| 3-55605 | 3/1991 | Japan . |
| 4-3256 | 1/1992 | Japan . |
| 4-101922 | 4/1992 | Japan . |

*Primary Examiner*—Robert J. Warden
*Assistant Examiner*—Krisanne M. Thornton
*Attorney, Agent, or Firm*—Finnegan, Henderson, Farabow, Garrett & Dunner

[57] ABSTRACT

In the manufacture of chemical products, foods, pharmaceuticals and the like, a movable tank (201) mounted on a conveying vehicle (100) movable along conveyance courses (1, 1') between a plurality of stations (11–16) for unit processes such as mixing and reaction is transferred between relative stations by a transferring device provided on the conveying vehicle, to thereby successively perform necessary processes, thus meeting the needs of a multi-product/small-lot production. An automatic connection device is provided for supplying electric power and fluid to the movable tank. Furthermore, when necessary, a traverser device (2) for transferring the movable tank is provided between one conveyance course (1) and another conveyance course (1'). Further, a washing device is provided for washing the movable tank after the completion of the processes.

22 Claims, 25 Drawing Sheets

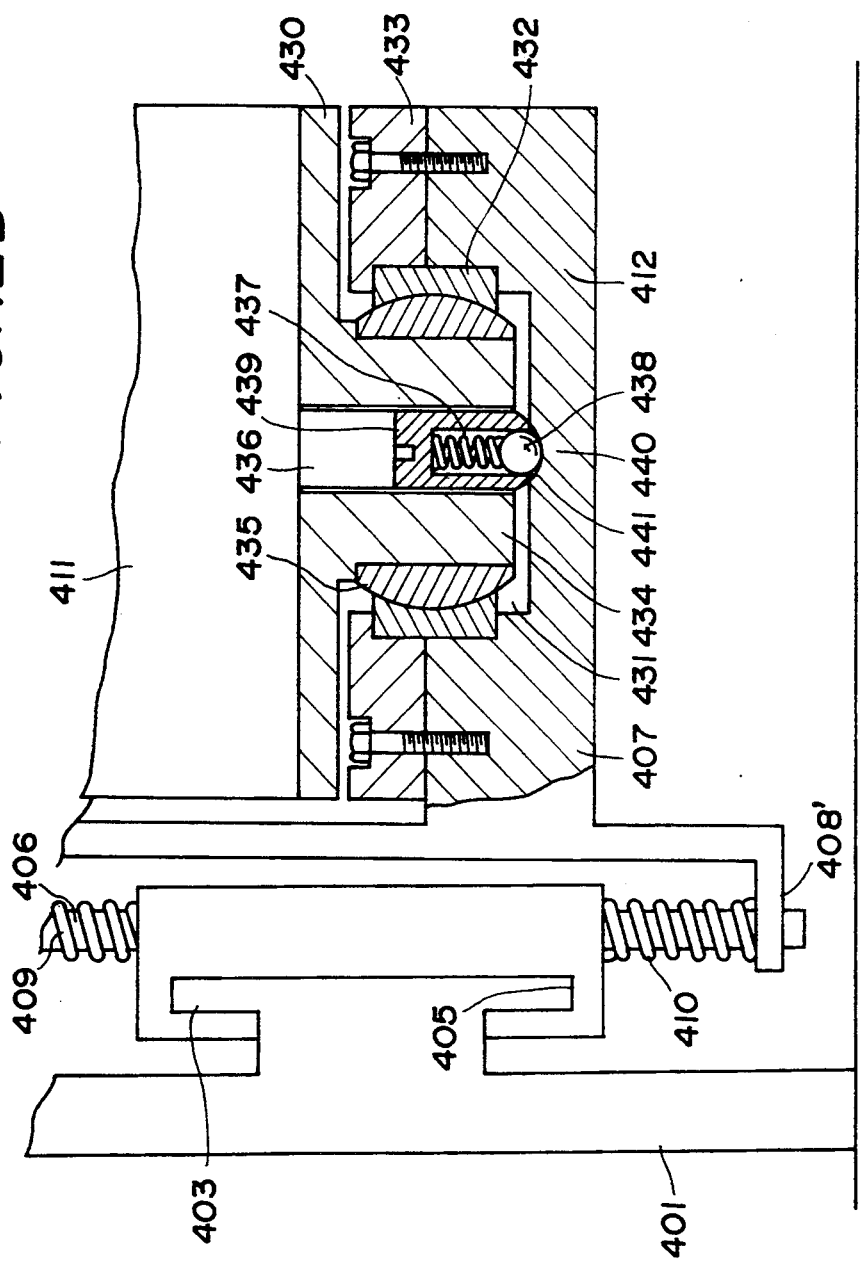

MOVABLE TANK TYPE MULTI-PURPOSE BATCH PRODUCTION SYSTEM

TECHNICAL FIELD

The present invention relates to a movable vessel type multi-purpose batch production system suitable for use in the production of chemicals, food stuffs, and pharmaceutical products.

BACKGROUND ART

Conventional few-product and large quantity production of chemicals, food stuffs, pharmaceuticals and the like, generally involves the use of vessels for agitation and reaction which are each connected up to respective piping. As a result there is the problem of laying a large amount of complicated piping, and of washing out the piping, as well as having to remove contaminants.

On the other hand, recently the demand for diversification and personalization of products has progressed and in order to meet this, the production of various companies has become much more diversified. The result is that, the conventional few-product and large quantity production type plants with their large amount of laid piping cannot deal with this, so that multi-product and small quantity/variable amount production has become the leading method.

That is to say, in order to meet the wide requirements of the consumer who desires a much more personalized functional merchandise than the conventional widely used merchandise, the merchandising concept is aimed towards personalization, high functionalization, high performance and high class, many brand of merchandise of which design and function is different even with the same merchandise are produced by using the large number of raw materials, and supplementary materials naturally, as well as using various types of additives and coloring agents, so that there is a strengthening in the trend towards a new demand for commodities.

Accordingly, even on the production site, it has become imperative to plan for production systems where production and stock management can be directly linked to market trends and which can respond quickly to product development, or production systems that are capable of excluding contamination in order to maintain quality.

In order to respond to these kinds of social trends and demands, development of multi-product and small quantity/variable quantity production systems has been progressing. At the present stage, production systems using movable vessels satisfy the above needs and there are said to be some very desirable production systems of high efficiency. A production system resembling this system has been experimentally adopted in part.

For example, a method for manufacturing paint is disclosed in published unexamined patent application number 60-186572 (1985), wherein a vessel for the production of the paint is loaded on an automatic guided vehicle and moved successively between stations provided with preparation process, mixing process and filling process. However, the disclosure in the unexamined patent application related to this technology, gives only a general outline with no detailed description, and there is nothing relevant concerning the operations of transfer, connection, and washing of the vessel which are essential technology for a movable vessel type production system of this type. In a related system there is a large difference in performance depending on the actual construction of the transfer, connection and washing equipment, and improvement in this system is accompanied by many problems.

For example, in the above publication, a conveyor system drive equipment is adopted as a means for transferring a tank from an automatic guided vehicle to a station, and returning the tank from the station to the guided vehicle. However, positioning equipment is not touched on. With a conveyor system, the accurate positioning of a heavy tank is generally difficult. Further, even with accurate positioning, in the case of an arrangement involving a plurality of stations and movable vessels, for the connections to have complete interchangeability, precision is required. Therefore, if the automatic connecting equipment does not have an alignment adjustment mechanism, piping and power connection is not possible. Accordingly, unit operations and control operations using the tank cannot be done.

Further, in this publication, no definite method for the cleaning of the tank is suggested.

In one example of conventional technology in the published disclosure, the volume of the vessel was limited to at the most one cubic meter, and so far the technology has not been established as a commercial production plant, and the use of the technology is also extremely limited. Therefore, at present, the production plant being based on the technology is not considered as equipment for wide applications. Further, reliably handling of dangerous fluids and automation of the complicated operation have not been sufficiently achieved, and in higher productivity there are many problems remaining to be solved.

DISCLOSURE OF THE INVENTION

It is a first object of the present invention to address the problems of conventional technology and provide a movable vessel type multi-purpose batch production system to respond to social trends and demands.

Accordingly, it is a second object of the present invention to provide a movable vessel type multi-purpose batch production system comprising transfer equipment whereby transfer of a movable vessel from a guidance course to each station and return of the movable vessel from each station to the guidance course may be precisely and easily achieved.

Further, it is a third object of the present invention to provide a movable vessel type multi-purpose batch production system comprising automatic connecting equipment for automatically connecting power equipment and fluid supply equipment at respective stations to receiving devices on a movable vessel after the movable vessel has been transferred to respective stations.

It is a fourth object of the present invention to provide a movable vessel type multi-purpose batch production system comprising appropriate washing equipment of a movable vessel for use in performing multi-product and small quantity production and for use in prevention of contamination common in multi-product small quantity production.

It is a fifth object of the present invention to provide a movable vessel type multi-purpose batch production system comprising traverser equipment whereby a movable vessel may be traversed whenever required from one guidance course to another guidance course so that multi-product and small quantity production may be dealt with flexibly.

In one aspect of the present invention there is provided a movable vessel type multi-purpose batch production system which comprises a plurality of stations for performing required unit operations, a guided vehicle for moving along a guidance course between the stations, a movable vessel mounted on the guided vehicle and moved between each station, and transfer equipment for transferring the movable vessel from the guided vehicle to each of the stations and returning the movable vessel from each of the stations to the guided vehicle, wherein the transfer equipment comprises a drive arm and drive device for driving the drive arm both provided on the guided vehicle, and an engagement device for engaging with the drive arm provided on the movable vessel, whereby the movable vessel may be transferred from the guided vehicle to each of the stations by extension of the drive arm, and the movable vessel may be returned from each of the stations to the guided vehicle by retraction of the drive arm.

In another aspect of the present invention there is provided a movable vessel type multi-purpose batch production system which comprises, a plurality of stations for performing required unit operations, a guided vehicle for moving along a guidance course between the stations, a movable vessel mounted on the guided vehicle and moved between each station and automatic connecting equipment for automatically connecting power supply equipment and fluid supply equipment at the stations to power receiving equipment and fluid receiving equipment provided on the movable vessel, after the movable vessel has been transferred to the station, the automatic connecting equipment comprising, a first table provided on either of the movable vessel or the station, and a second table provided on either of the station or the movable vessel respectively, a receptacle device provided on either of the first table or the second table for alignment thereof, and a connecting device provided on either of the second table or the first table respectively for alignment thereof and for connection to the receptacle device, wherein the power receiving equipment and the fluid receiving equipment are provided on either of the first table or the second table and, the power supply equipment and the fluid supply equipment are provided on either of the second table or the first table respectively, characterized in that all or some of an adjusting device for adjustment in a plane perpendicular to the direction of connection between the power supply equipment and fluid supply equipment, and the power receiving equipment and the fluid receiving equipment, an adjusting device for adjustment in a direction parallel to the connection direction, and a revoluting device for tilting in all directions about the perpendicular plane, are provided on one of the first table and the second table, and the remainder of the three devices are provided on the other of the first table and the second table.

In yet another aspect of the present invention there is provided a movable vessel type multi-purpose batch production system which comprises, a plurality of stations for performing required unit operations, a guided vehicle for moving along a guidance course between the stations, a movable vessel mounted on the guided vehicle and moved between each station and washing equipment for washing of the movable vessel after discharge of the contents on completion of a required operation, the washing equipment comprising, a drive shaft provided with a washing fluid passage internally formed in a longitudinal direction thereof, a follower shaft fitted externally to the drive shaft so as to rotate freely thereabout, a drive arm standingly provided on the drive shaft, a follower arm standingly provided on the follower shaft, and a brush holder linked to the follower arm so as to turn freely thereabout, with an end of the drive arm slidably fitted therein, characterized in that, when an angular difference between the drive arm and the follower arm changes in accordance with an increase or decrease in rotation of the drive shaft, the brush holder automatically extends or retracts respectively, and washing fluid from the washing fluid passage inside the drive shaft may be sprayed outward in conformity with rotation of the drive shaft.

In even yet another aspect of the present invention there is provided a movable vessel type multi-purpose batch production system which comprises, a plurality of stations for performing required unit operations, a guided vehicle for moving along a guidance course between the stations, a movable vessel mounted on the guided vehicle and moved between each station and traverser equipment whereby the movable vessel may be traversed from one guidance course to another guidance course as required, the traverser equipment comprising, a traverse platform disposed between the one guidance course and the another guidance course, a traverse base provided on the traverse platform so as to be movable back and forth in a longitudinal direction of the traverse platform by a pulling apparatus, and a connecting and disconnecting apparatus for connecting and disconnecting the movable vessel on the guided vehicle, and the traverse base, characterized in that, the traverse base and the movable vessel may be connected by the connecting and disconnecting apparatus, and the movable vessel may be traversed onto the traverse platform by drive of the pulling apparatus acting through the traverse base.

The control of various operations of each unit operation may be carried out all inclusively depending on the control equipment.

In this way, with the system of the present invention, at first an automatic guided vehicle which is carrying a movable vessel, runs between stations having the required functions for production such as raw material supply, agitation, filtration, heating, cooling, reaction, filling, discharge and washing, disposed along the guidance course, and stops at predetermined positions. The movable vessel is then transferred to a predetermined position on the station by the transfer equipment, and the fixed equipment on the station is connected to the equipment on the movable vessel. Following that, the operation determined for the particular station is performed independently with respect to the movable vessel, and on completion of the operation, the movable vessel is returned from the station to the automatic guided vehicle again by the transfer equipment. The automatic guided vehicle then runs to the next station and with repetition of similar actions production is performed.

With the system of the present invention demonstrating this type of basic operation, in the construction there is provided as the most important essential technology, transfer equipment which transfers the movable vessel from the guided vehicle to the station and returns the movable vessel from the station to the guided vehicle, automatic connecting equipment for automatically connecting each station power source equipment and fluid supply equipment to movable vessel receiving equipment, movable vessel washing equipment, and traverser equipment for traversing the movable vessel from one guidance course to another guidance course. Consequently multi-product and small quantity productions may be carried out with flexibility.

BRIEF DESCRIPTION OF THE DRAWINGS

FIG. 12B is a side sectional view showing another embodiment of a Z table of the movable vessel connecting equipment;

BEST MODE FOR CARRYING OUT THE INVENTION

Figure 1:
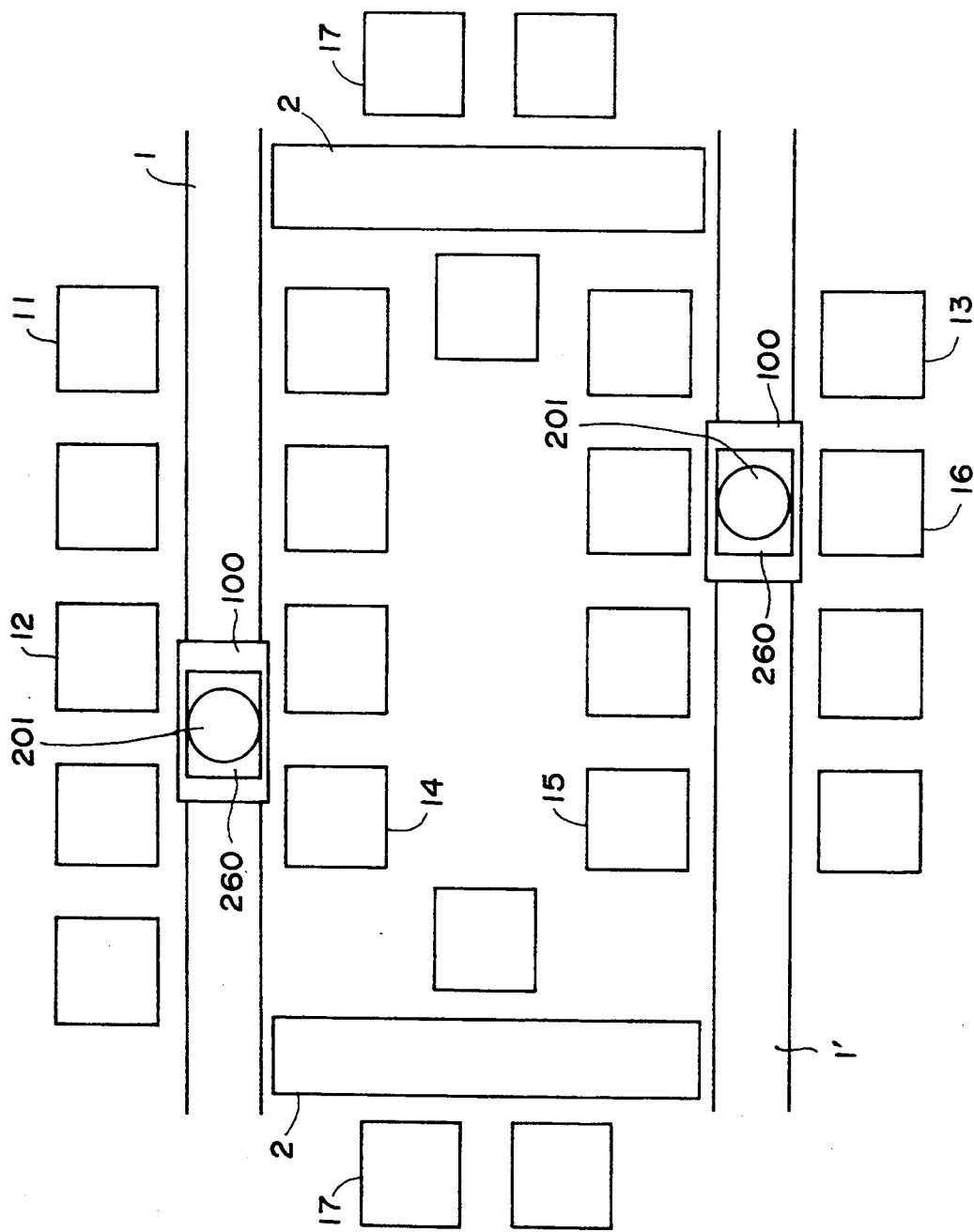
FIG. 1 is a station distribution diagram for a movable vessel type multi-purpose batch production system according to the present invention.

Embodiments of the present invention will be described based on the accompanying drawings. FIG. 1 is a station distribution diagram of a movable vessel type multi-purpose batch production system according to the present invention. As shown in the diagram, respective independent stations for management of unit operations are efficiently arranged on one side or both sides of guidance tracks 1 and 1'. That is to say as required for production, there is a raw material supply station 11, an agitation station 12, a washing station 13, a filtration station 14, a heating/cooling station 15, and a filling-/discharge station 16. Each of the above stations is equipped with fixed equipment and connecting piping and the like. Item 100 in the drawing is a guided vehicle. The guided vehicle 100 is loaded with a truck 200 having a movable vessel 201 formed integral therewith, and runs along a guidance track as far as a target station where it is stopped at a predetermined position by a later mentioned positioning device. Item 2 in the drawing is a traverse track platform laid perpendicular to the two guidance tracks. This platform 2 is for traversing the movable vessel 201 from one guidance track to the other guidance track. The above-mentioned movable vessel 201 is formed integral with the truck 200, however it is possible to have the movable vessel 201 and the truck 200 constructed separately.

Figure 2:
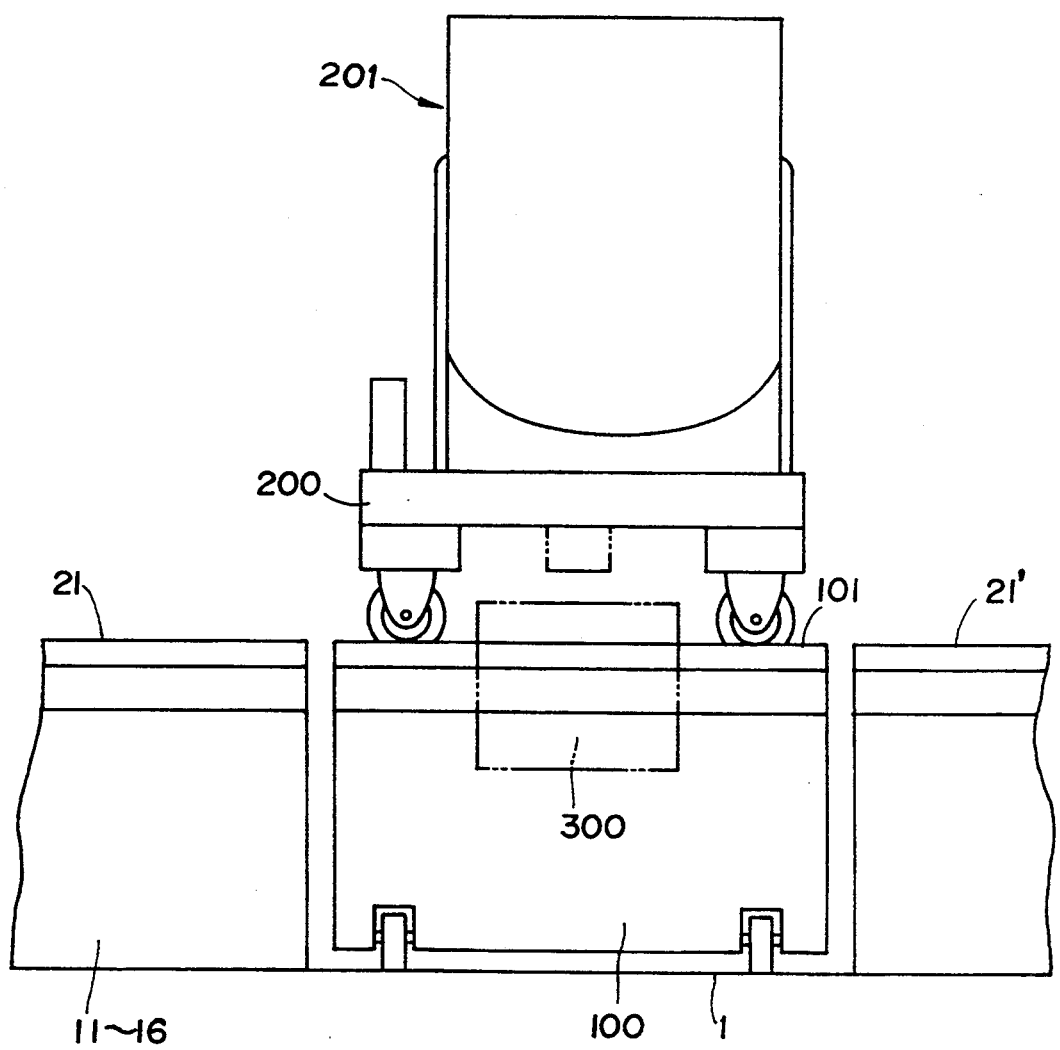
FIG. 2 is an elevation structural diagram showing a positional relationship between a guided vehicle and respective stations of the present invention.

FIG. 2 shows the positional relationship between the guided vehicle 100 and the respective stations. Item 200 is the truck for the movable vessel 201 and item 100 is the guided vehicle loaded with the movable vessel 201. Each station 11 to 16 is arranged in a longitudinal direction along the guidance tracks 1 and 1'. The guided vehicle 100 is stopped at predetermined positions by a later mentioned positioning device. There is an insignificant gap between the guided vehicle 100 and the respective stations, and the rail 101 on the guided vehicle 100 and rails 21, 21' on each station are in one line. Accordingly, the movable vessel 201 may be moved smoothly from the guided vehicle 100 to the station by operation of a transfer device 300 carried on the guided vehicle 100, and may be smoothly returned from the station to the guided vehicle 100.

Figure 3:
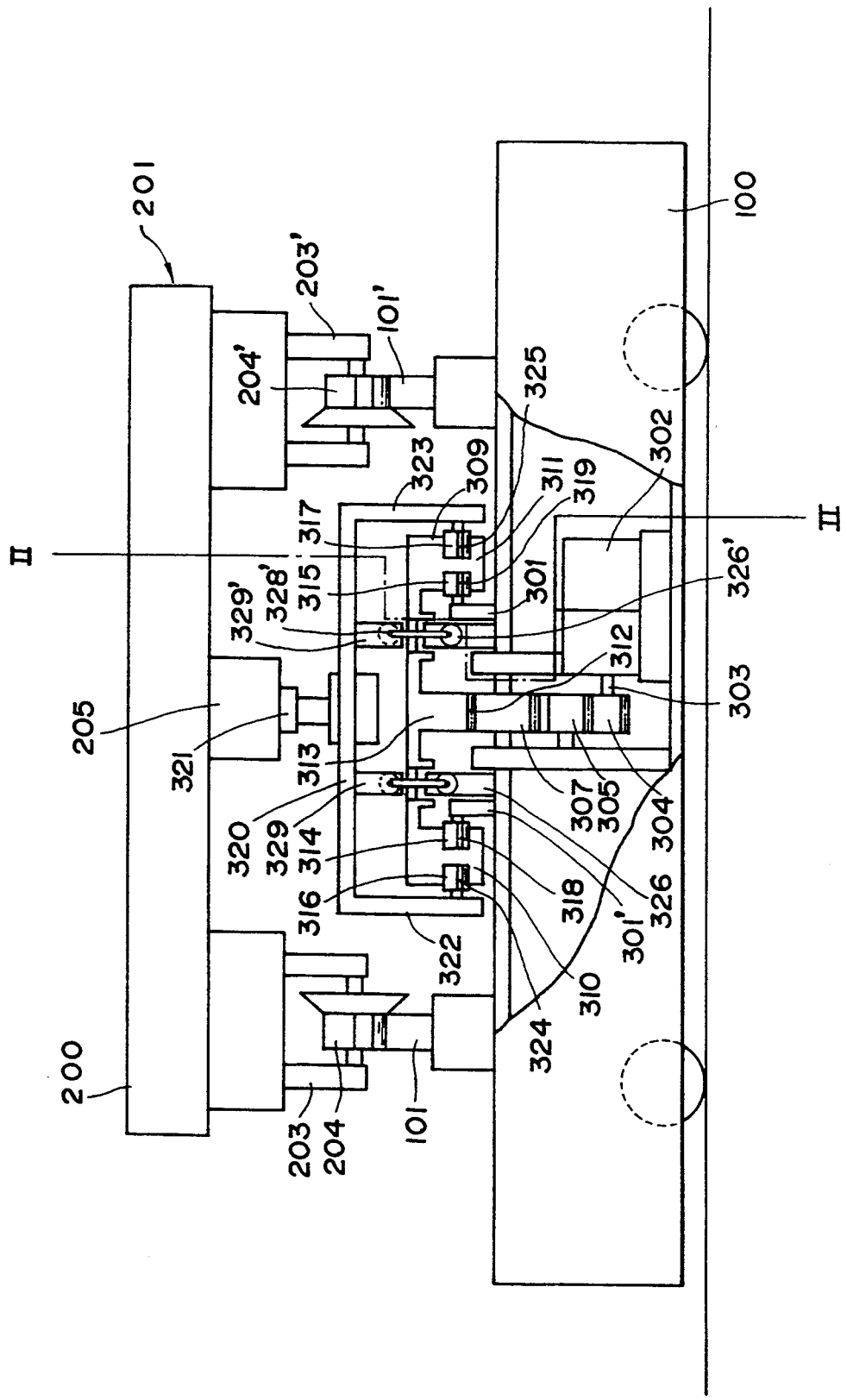
FIG. 3 is an elevation view showing a transfer equipment of an embodiment of the present invention.
Figure 4:
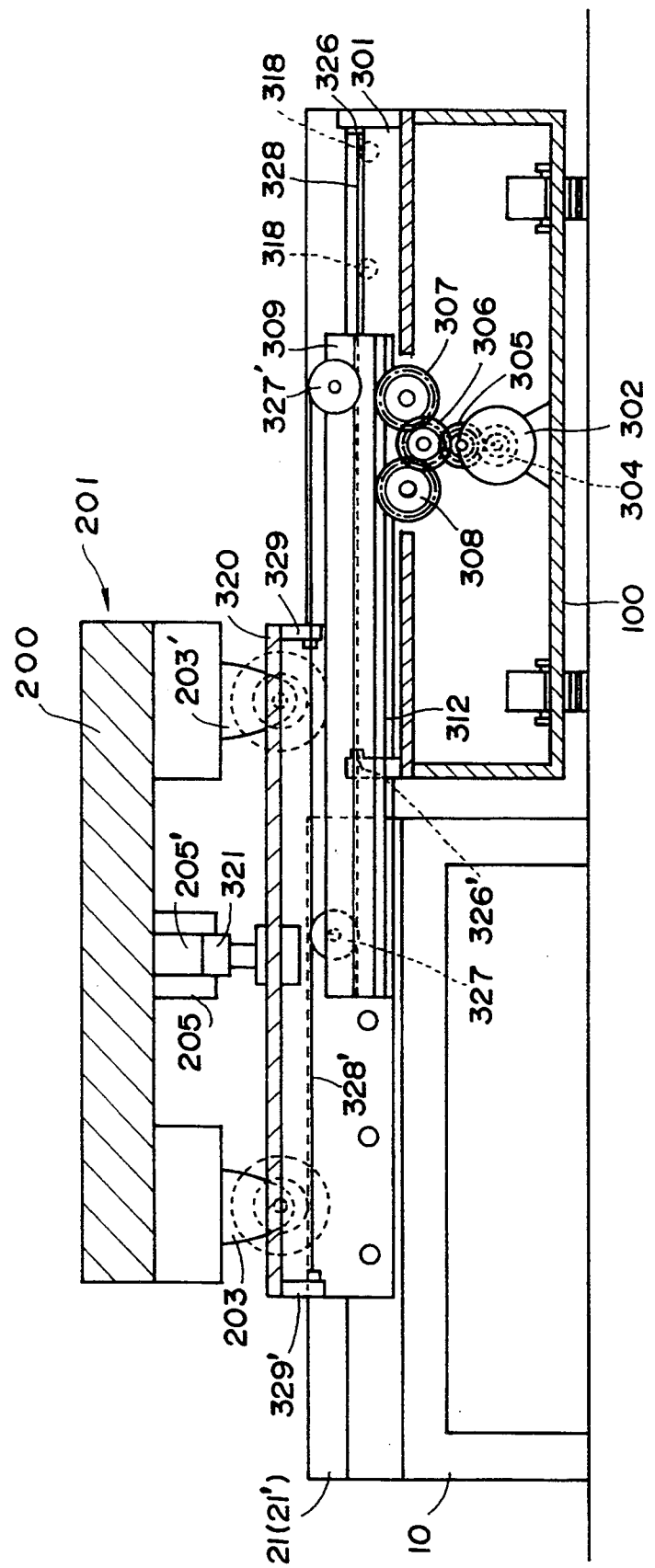
FIG. 4 is a side elevation view showing the transfer equipment of an embodiment of the present invention.

FIG. 3 and FIG. 4 are an elevational view and a side view respectively showing transfer equipment according to an embodiment of the present invention. Item 100 in the drawing is the guided vehicle. On an upper surface of the guided vehicle 100 is provided guide roller bearing protrusions 301, 301' for taking guide rollers. These are provided at a predetermined distance apart in the form of parallel rails running in a longitudinal direction. Also an electric motor 302 for the guided vehicle 100 is provided. A drive gear 304 is axially supported by a shaft 303 of the electric motor 302. The drive gear 304 engages with intermediate gears 305 and 306. Pinions 307 and 308 are meshed with the intermediate gear 306. With this arrangement, the shaft 303 is rotated through a reduction gear. By rotation of the electric motor 302, the drive gear 304 axially fixed to the shaft 303 is rotated and the pinions 307, 308 are rotated in respective same directions by the intermediate gears 305, 306.

Item 309 in the drawing is a first drive arm. On both widthwise edge portions of the first drive arm 309 are formed downwardly protruding support elements 310, 311. On a lower face of a central portion of the first drive arm 309 is formed a downwardly protruding central support portion 313 having a rack 312 formed thereon. The rack 312 is formed such as to engage with the pinions 307, 308. Longitudinally aligned grooves 314, 315 are provided in respective inner side portions of the support elements 310, 311 at both ends of the first drive arm 309. Furthermore, longitudinally aligned grooves 316, 317 are provided in respective outer side portions of the support elements 310, 311 at both ends of the first drive arm 309.

In the drawing 318, 318 . . . and 319, 319 . . . are guide rollers supported on shafts so as to rotate freely, and provided at respective predetermined distances on the rail shaped guide roller bearing protrusions 301, 301' provided on the upper face of the guided vehicle. The guide rollers 318, 318 . . . and 319, 319 . . . freely fit into grooves 314, 315 formed in inner sides of respective support portions 310, 311 at both ends of the first drive arm 309. As well as supporting the first drive arm 309, they allow smooth movement of the first drive arm 309.

In the drawing item 320 is a second drive arm. On an upper face of a central portion of the second drive arm 320, is provided a claw 321 which can move in and out freely up and down. Also, at both ends of the second drive arm 320, protruding in a downward direction, are formed support portions 322, 323. On respective inner sides of the support portions 322, 323, second guide rollers 324, 324 . . . and 325, 325 . . . are separated at predetermined distances apart in a longitudinal direction, as well as supported on shafts so as to be freely rotatable. The second guide rollers 324, 324 . . . and 325,325 . . . are fitted freely into longitudinally aligned grooves 316, 317 formed in outer sides of support portions 310, 311 at both end of said first drive arm 309. Accordingly the second drive arm 320 is supported by the first drive arm 309 so as to be smoothly movable.

Item 326 in the drawing is a wire fixture portion provided at one end of an upper portion of the guided vehicle 100. Furthermore, item 327 is a pulley provided at the end portion of the first drive arm 309 positioned further away from the wire fixture portion 326. A wire 328, having one end fixed to the wire fixture portion 326, is provided so as to pass within the space between the support portion 310 at one end of the first drive arm 309 and the central support portion 313, and extends in an opposite direction via the pulley 327 by a length shorter than the full span of the first drive arm 309. The other end of the wire 328 is fixed to a wire stop device 329 provided at one end of the second drive arm 320.

Accordingly, with operation of the electric motor 302, the shaft 303 is rotated by way of the reduction gear, thereby rotating the drive gear 304 fixed to the gear shaft 303, and via the intermediate gears 305, 306 engaged therewith, the pinions 307, 308 are rotated. Further, by means of the rack 312 formed in the lower face of the central support portion 313 of the first drive arm 309, engaging with the pinions 307, 308, said first drive arm 309 is moved horizontally in a longitudinal direction. As beforementioned, the wire 328 which is wrapped around the pulley 327 disposed on the first drive arm 309, is fixed to an end of the second drive arm 320. As a result, with movement of the first drive arm 309, the second drive arm 320 moves in a longitudinal horizontal direction two times the movement of the first drive arm 309.

When the drive gear 304 is turned in an opposite direction to the beforementioned direction by means of the electric motor 302, the mechanism for returning the second drive arm 320 to its origin operates as follows. At first, one end of the wire 328' in the space between the end support portion 311 of the first drive arm 309 and the central support portion 319, is fixed to the wire stop device 329' provided at one end of the second drive arm 320. Then, by way of a pulley 327' provided on the first drive arm 309 at a position on an opposite side in a longitudinal direction to the position of the pulley 327, the other end of the wire 328' is fixed to a wire fixture portion 326' on an upper portion of the guided vehicle 100, and the second drive arm 320 returns.

Items 101, 101' in the drawing are rails laid on an upper portion of the guided vehicle 100. Wheels 204, 204' are supported on shafts in wheel support portions 203, 203' which hang down from both end portions of the movable base 202. The wheels 204, 204' run on rails 101, 101'.

Item 205 is a contact plate (an engagement device for receiving the second drive arm 320) provided in a central portion of the lower face of the movable vessel 201. A spacer portion 205' which is engageable with the claw 321 provided in the beforementioned second drive arm 320, is formed in a central portion of the contact plate 205. By engagement of the claw 321 with the spacer portion 205', the movable base 202 may also be moved at the same time in accordance with movement of the second drive arm 320.

Item 10 in the drawing is a station platform, and items 21, 21' are rails laid on the station platform 10.

An embodiment of the transfer equipment of the present invention is constructed as above. Consequently, in a movable vessel type multi-purpose production system, the guided vehicle 100 carrying the movable vessel 201 (shown as a movable base 202 in FIGS. 3 and 4) is induced along predetermined guidance tracks to move in succession to a plurality of process stations, and the movable vessel 201 is transferred to the stations. At the point of transfer, in the case of the present embodiment, at first the guided vehicle 100 is stopped at a position determined by the later mentioned positioning device, in the vicinity of the station platform 10 so that the rails 101, 101' on the guided vehicle 100 and the rails 21, 21' laid on the station platform 10 align in a straight line. Then, the electric motor 302 provided on the guided vehicle 100 is operated, rotating the drive gear 304 fixed to the drive shaft 303 by way of the reduction gear 302, and rotating the pinions 307, 308 by way of the intermediate gears 305, 306 which engage with the drive gear 304. Subsequently, the first drive arm 309 is moved horizontally in a longitudinal direction due to the engagement of the rack 312 formed in the lower face of the central support portion of the first drive arm 309 with the pinions 307, 308. In conjunction with this movement, the plurality of guide rollers 318, 318 . . . and 319, 319 . . . provided on the rail shaped guide roller bearing protrusions 301, 301' longitudinally aligned on an upper face of the guided vehicle 100, fit freely into the longitudinally aligned grooves 314, 315 in the inner sides of the respective support portions 310, 311 at both ends of the first drive arm 309 so that the first drive arm 309 can move smoothly. Also the first drive arm 309 is supported on the rail shaped guide roller bearing protrusions 301, 301' through the guide rollers 318, 318 . . . and 319, 319 . . . so as not to sway.

Furthermore, in accordance with the movement of the first drive arm 309, the second drive arm 320 connected to the first drive arm 309 by the wire 328 via the pulley 327, moves horizontally two times the movement of the first drive arm 309. The movable truck 200 engaged with the second drive arm 320 and the claw 321, also moves on the rails 101, 101' and is transferred to the rails 21, 21' on the station platform 10 which are in straight line alignment with the rails 101, 101'.

Now, at the time of movement of the second drive arm 320, the second guide rollers 324, 324 . . . and 325, 325 . . . axially supported in a longitudinal direction on the respective inner sides of the support portions 322, 323 at both ends of the second drive arm 320, fit freely in the longitudinally aligned grooves 316, 317 formed in the outer sides of the support portions 310, 311 at both ends of the first drive arm 309, so that movement of the second drive arm 320 is extremely smooth.

As mentioned before, when the transfer of the movable truck 200 of the movable vessel 201 (shown in FIG. 2, but not shown in FIG. 3 or FIG. 4) to the station platform 10 has been completed, the claw 321 of the second drive arm 320 lowers, and releases engagement with the movable base 202. Then, the electric motor 302 operates and drive gear 304 rotates in an opposite direction to before and the first drive arm 309 moves in the opposite direction to before. Accordingly, by operation of the wire 328' and the pulley 327' of an original position return device, the second drive arm 320 is returned to the original position and the movable vehicle 202 returns to the station platform 10.

Here, the emptied guided vehicle 100 is used for another process, and when the operation of the movable vessel 201 transferred to the station platform 10 is completed, the guided vehicle 100 is guided as far as the station platform 10 and the movable vessel 201 is reversibly transferred to the guided vehicle 100 (returned).

Now, instead of the beforementioned wires 328, 328' and pulleys 327, 327', sprockets and chains may be used, and for the drive unit for driving the first drive arm 309, a motor using gas pressure or oil pressure may be used instead of an electric motor. Furthermore it may be possible to directly move the drive arm with an air pressure or oil pressure cylinder.

Also, at the end portions of the rails 101, 101' and 21, 21' laid on the guided vehicle 100 and the station platform 10 respectively are provided wheel stop devices whereby the movable truck 200 of the movable vessel 201 is stopped at a predetermined position.

Figure 5:
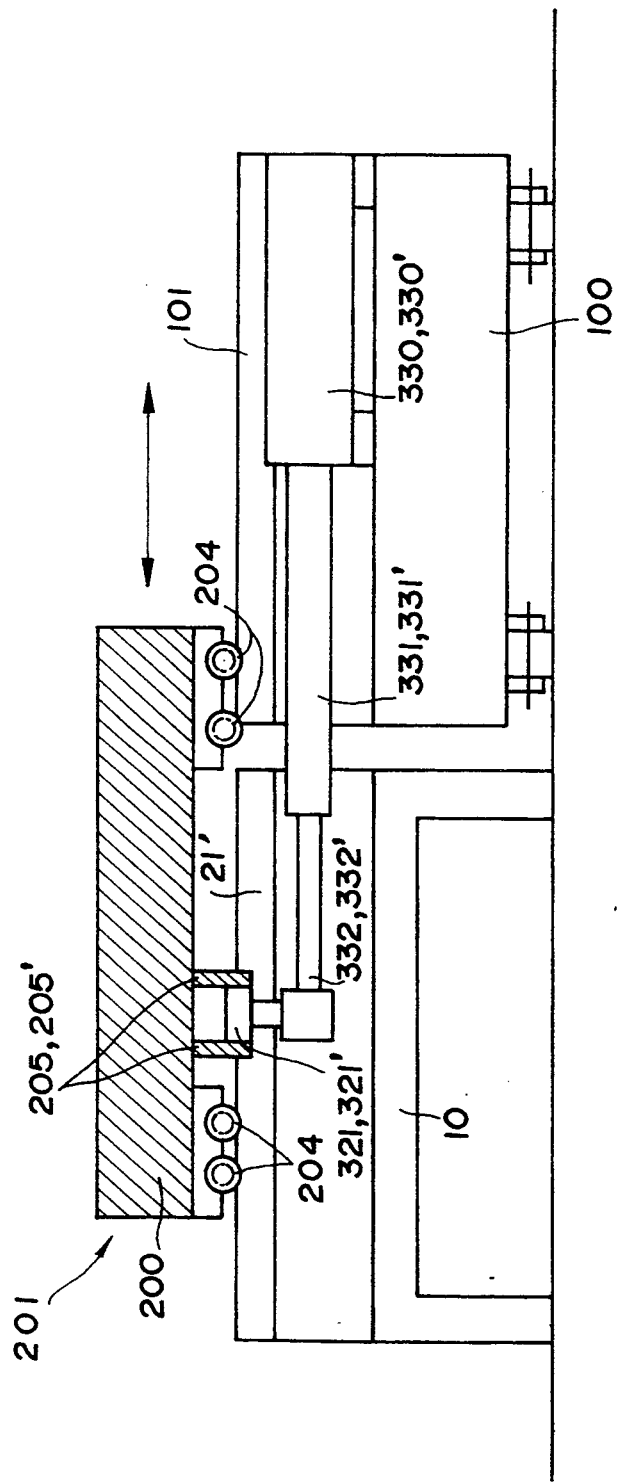
FIG. 5 is a side sectional view showing the transfer equipment of another embodiment of the present invention.
Figure 6:
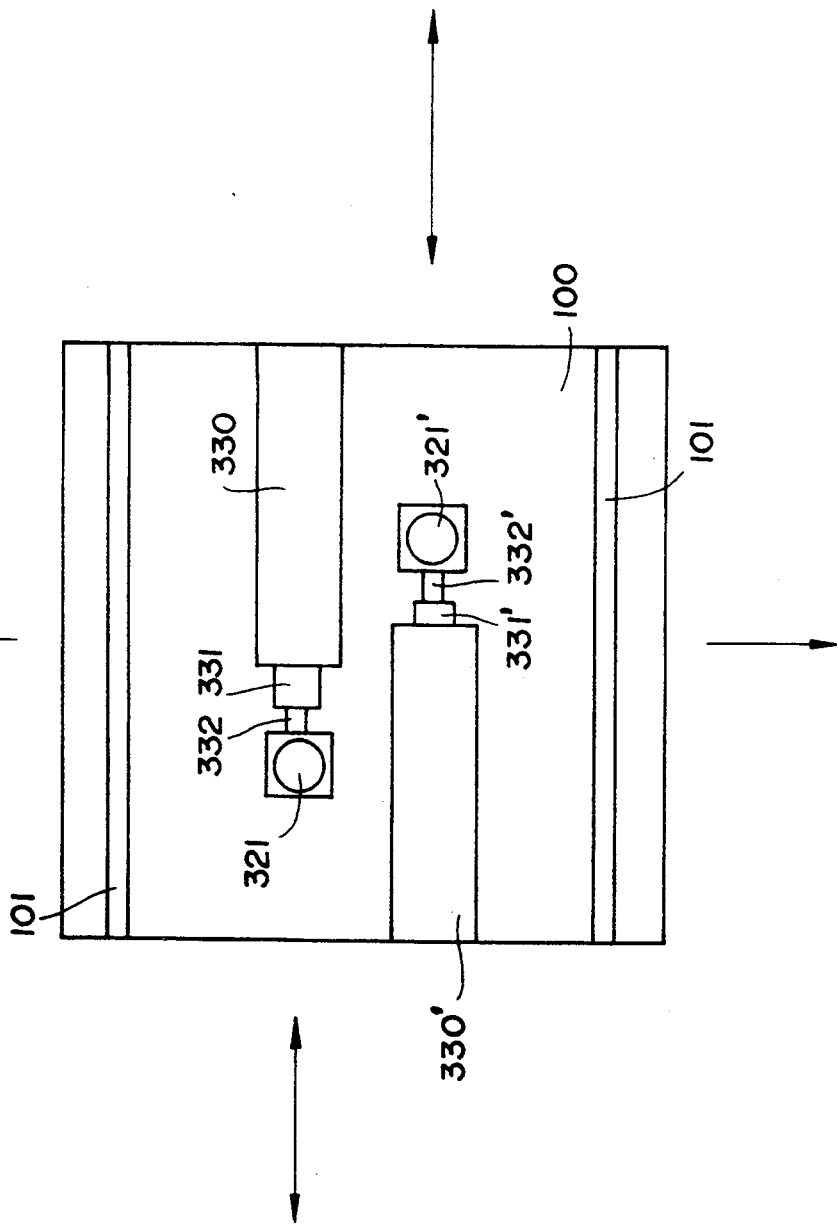
FIG. 6 is a top plan view showing the transfer equipment of another embodiment of the present invention.

FIG. 5 and FIG. 6 are a side sectional view and top plan view respectively of another embodiment of the transfer equipment for precisely transferring the movable vessel from the guided vehicle to the station and returning it from the station to the guided vehicle. This embodiment involves a simple mechanism but requires a second set of drive arms.

As shown in the drawing, two telescopic cylinders (drive means) 330, 330' are fixed to the guided vehicle 100 orthogonal to the guidance track with the piston rods of the cylinders facing to the right side and left side respectively.

The telescopic cylinders 330, 330' have the piston rods extending and contracting in two stages. In the first stage, the first arms 331, 331' are extended, and in the second stage the second arms 332, 332' are extended.

Fixed to the end portions of the second drive arms 332, 332' are claws 321, 321' freely movable up and down.

On the other hand, contact plates (engaging devices) 205, 205' with openings are attached to a bottom portion of the truck with movable vessel 200 so that said claws fit therein.

Item 21 in the drawing is a rail on the station platform 10 and item 101 is a rail on the guided vehicle 100.

Accordingly, the guided vehicle 100 follows along the guidance track as far as the target station, and stops at predetermined position so that the rail 101 on the guided vehicle 100 is lined up with the rail 21 on the station platform 10. The claw 321 fixed to the end portion of the telescopic cylinder 330 fits into the contact plate 205 attached to the bottom portion of the truck with movable vessel 200. Accordingly, when the truck with movable vessel 200 is transferred to the station to the left side of the guidance track, the telescopic cylinder 330 is operated and the first drive arm 331 is extended and in continuation the second drive arm 332 is extended to a predetermined position and both stop. Then the claw releases from the contact plate and the cylinder is retracted.

When the movable vessel is returned to the station platform, the opposite operation to the above is performed. That is to say, after the cylinder extending and the claw fitting into the contact plate, the drive arm is retracted and the movable vessel is returned to the station platform. Also when the movable vessel is transferred to the station platform on the right side of the guidance track, exactly the same operation is performed.

The method of transfer and return of the movable vessel is not limited to the above mentioned method. A pin may be fixed to the end of a chain carried on the guided vehicle and a hook may be provided on a lower portion of the truck with movable vessel. By engagement of the pin and the hook, and letting out the chain or pulling in the chain, the truck with movable vessel can be easily transferred and returned.

Now, the bottom face of the movable base of the movable vessel may be made flat without rails, and a movable guide apparatus may be provided on the side faces of the guided vehicle and the station platform. The first drive arm and the second drive arm may be moved in the before stated mode by means of a free conveyor and the like. Alternatively, without using the first drive arm and the second drive arm, a claw may be attached to an end portion of a chain, the claw engaged with the movable base, and the chain in the guide groove may be wound in and let out by a gear via a sprocket so that the movable vessel may be easily transferred and returned.

Figure 7:
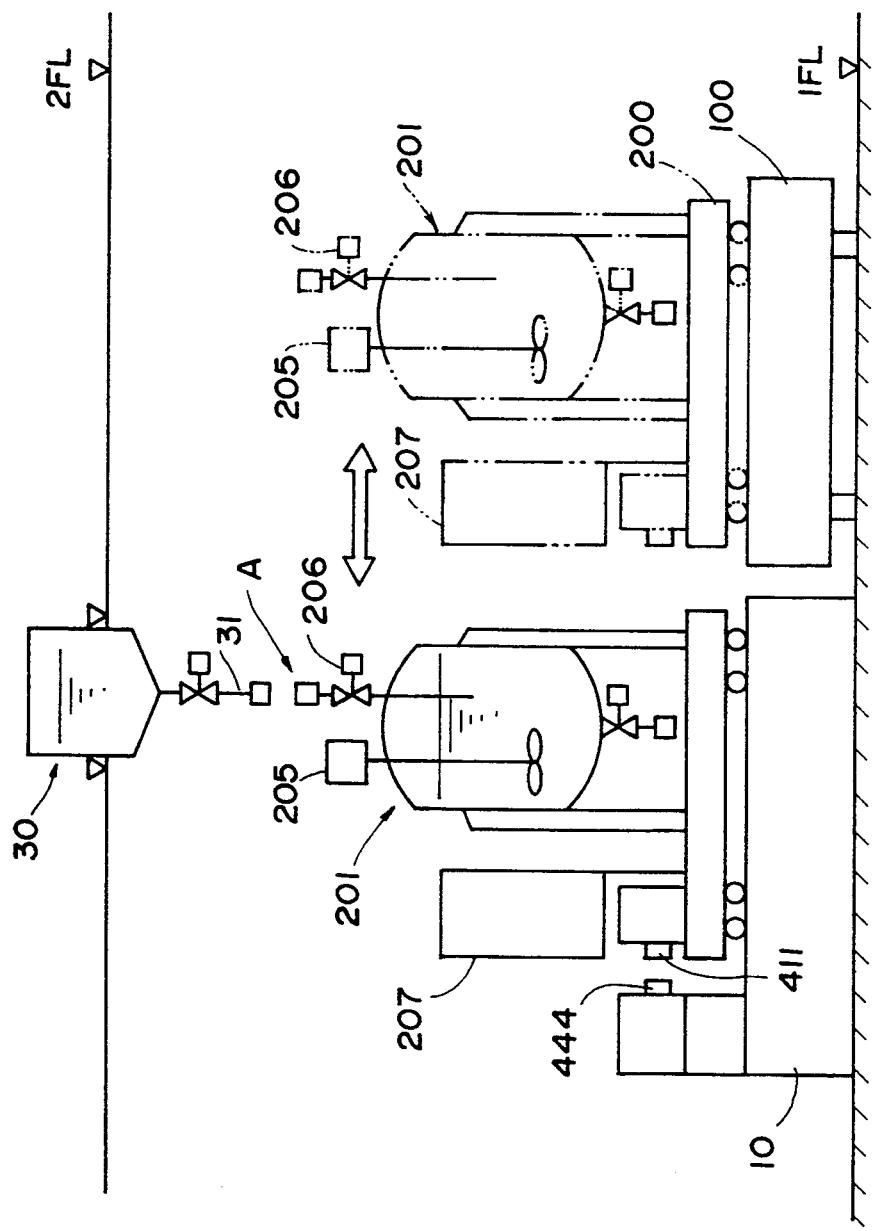
FIG. 7 is an elevational structural diagram showing an automatic connecting equipment of an embodiment of the present invention in a condition where a loaded movable vessel is connected to fixed equipment on the station side.

FIG. 7 shows an embodiment of automatic connecting equipment according to the present invention with a loaded movable vessel 201 connected to fixed apparatus on the station.

The movable vessel 201 comprising the truck 200 loaded on a guided vehicle 100, has a motor 205 for driving an agitator, and raw material receiving piping-/valves 206 as fluid receiving means. Devices on the movable vessel side including a control panel 207 for controlling the equipment, and a plug body 411 (power receiving device) for supplying power to the control panel is all loaded on the truck 200 of the movable vessel 201.

On the other hand, a power point body 444 (power source facility) is provided on the station platform 10 as a fixed side apparatus, and a raw material tank 30 and supply piping 31 (fluid supply equipment) are fixedly provided above the station platform. The guided vehicle 100 moves to the target station and stops at a predetermined position. The beforementioned transfer equipment is operated and the movable vessel 201 is transferred to the station platform 10, and the movable side plug body 411 and the fixed side power point 444 are smoothly connected. Power is then supplied to the truck with movable vessel 200 and the supply piping 31 and the raw material receiver pipe 206 are connected by a piping connector A. The motor 205 is then switched on and the agitator operates.

Figure 12A:
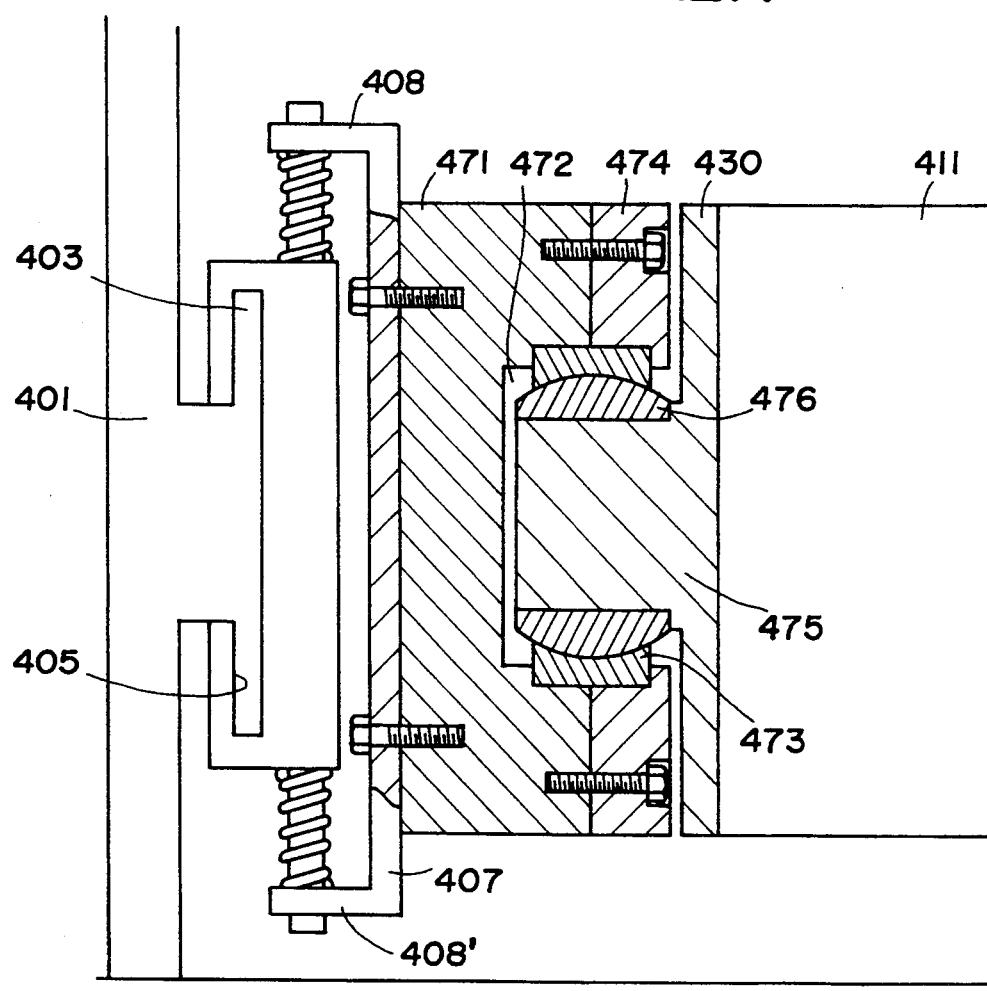
FIG. 12A is a side sectional view showing a Z table of the movable vessel connecting equipment of an embodiment of the present invention.
Figure 13:
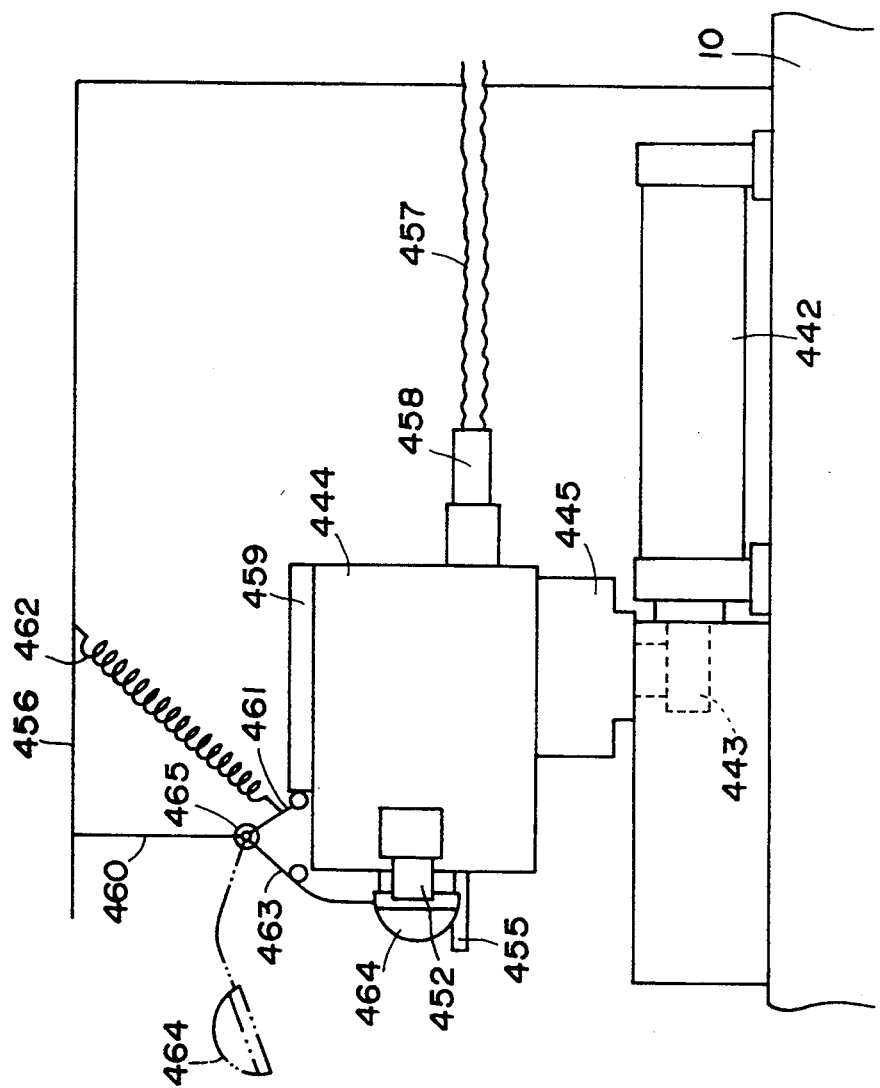
FIG. 13 is a side view showing a connecting equipment on the station platform side.
Figure 14:
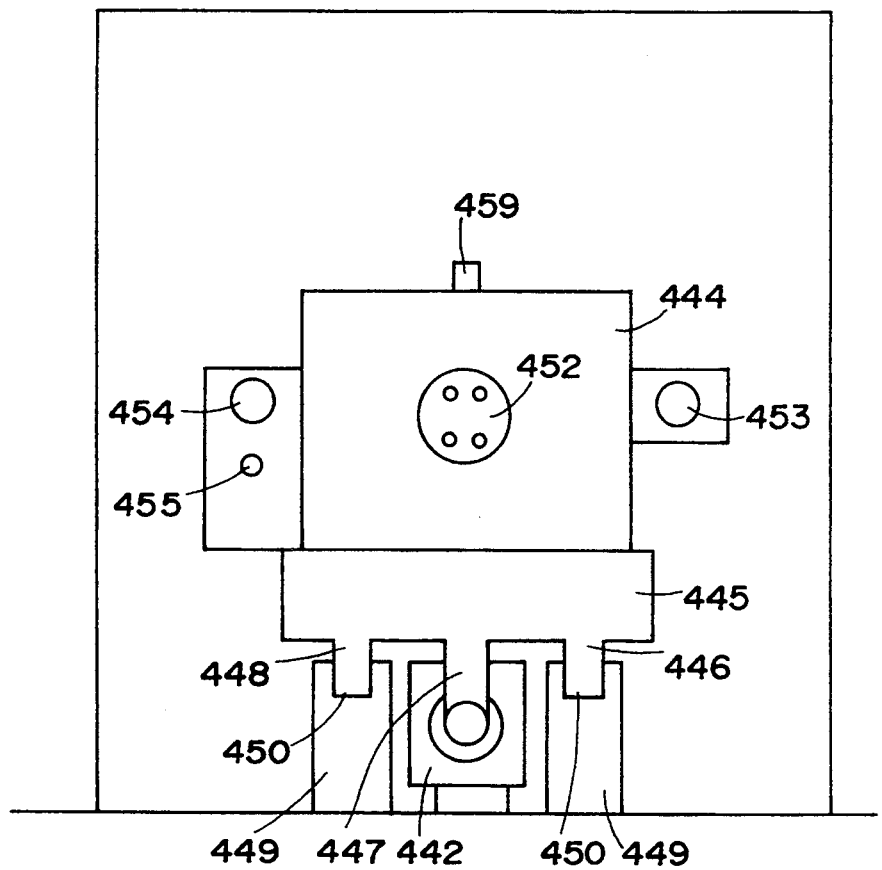
FIG. 14 is an elevation view showing the connecting equipment on the station platform side.
Figure 15:
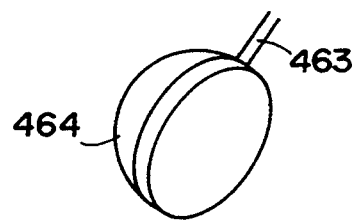
FIG. 15 is a perspective view showing a plug point cap used in the connecting equipment on the station platform side.

The automatic connecting equipment according to the present invention will now be explained in detail. FIG. 8 to FIG. 12 show the automatic connecting equipment on the movable vessel side while FIG. 13 to FIG. 15 show the automatic connecting equipment on the station side. The automatic connecting equipment of the present invention is made up as one unit incorporating the connecting equipment on the movable vessel side and the connecting equipment on the station side.

Figure 8:
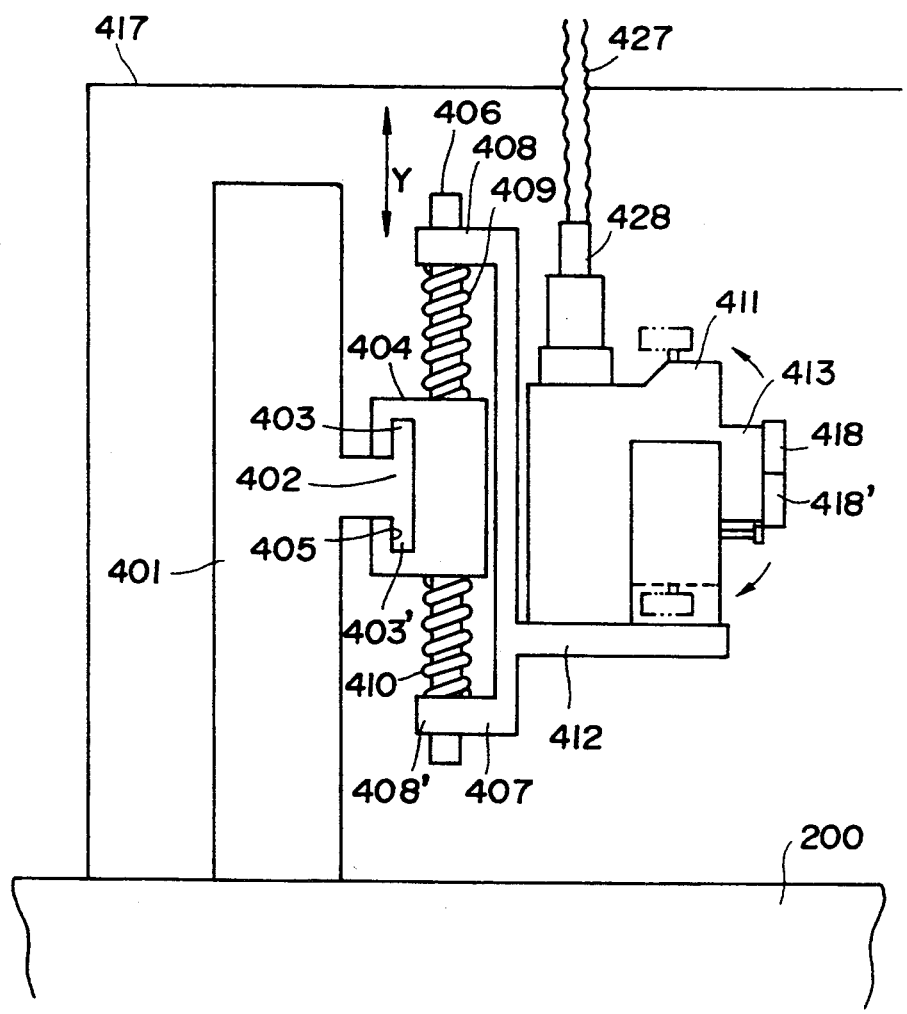
FIG. 8 is a side elevation structural diagram showing a connecting equipment on the movable vessel side of the automatic connecting equipment of the present invention.

First of all, the connecting equipment on the movable vessel side will be explained with reference to FIG. 8 to FIG. 12B. In FIG. 8 item 200 is the truck for the movable vessel. On the movable vessel truck 200 is provided a vertically standing frame 401. At a central portion of the frame 401 is protrudingly provided and integral therewith, a guide protrusion 402 which acts as a guide.

The guide protrusion 402 is aligned in a horizontal direction, that is to say in a direction perpendicular to the paper (the direction arrow X in FIG. 9) and at an end port ion thereof are protrudingly provided upper and lower slide rails 403, 403'. The X direction is a direction perpendicular to the direction of connection of the beforementioned plug body 411 and the power point body 444.

In the drawing, 404 is an X table. A recess shaped guide groove 405 is formed in the X table 404 into which are freely inserted slide rails 403, 403' of the guide protrusion 402. By engagement of the slide rails 403, 403' with the recess shaped guide groove 405 of the X table 404, the X table 404 can slide freely in the X direction. The guide protrusion 402 and the X table 404 in the present embodiment make up an adjusting means for adjustment in a direction perpendicular to the connecting direction of the power point 444 and the plug body 411.

In the drawing, 406 is a slide shaft piercingly disposed in the X table 404 in a vertical direction, that is to say an up/down direction of the movable vessel (direction of arrow Y in FIG. 8). The upper and lower ends of the slide shaft 406 are freely inserted into horizontally bent portions 408, 408' of respective upper end and lower end portions of an X-Y table 407. Furthermore, a spring 409 is inserted between the upper horizontally bent portion 408 of the X-Y table 407 and an upper face of the X table 404. Also, a spring 410 is provided around the slide shaft 406 and between the lower horizontally bent portion 408' and the lower face of the X table 404. The slide shaft 406, the X-Y table 407 and the spring 410 comprise an adjustment means in the direction parallel to the connection direction in the present embodiment.

Accordingly, the X table 404, is freely movable in the X direction by means of the slide rails 403, 403'. The X-Y table 407 moves as one with the X-table 404 in the X direction of the X table 404. Also, the X-Y table 407 moves freely up and down (in the Y direction) with respect to the X table 404 by means of the fixed slide shaft 406 which passes through the X table 404.

Now the X-Y table 407 is normally maintained in a central position by means of the spring 409 disposed between the upper horizontally bent portion 408 of the X-Y table 407 and the upper face of the X table 404, and the spring 410 disposed between the lower horizontally bent portion 408' of the X-Y table 407 and the lower face of the X table 404. Furthermore, although not shown in the figure, a load balancing spring for maintaining the X table 404 in a central position with respect to both sides of the X-Y table 407, is provided.

Figure 9:
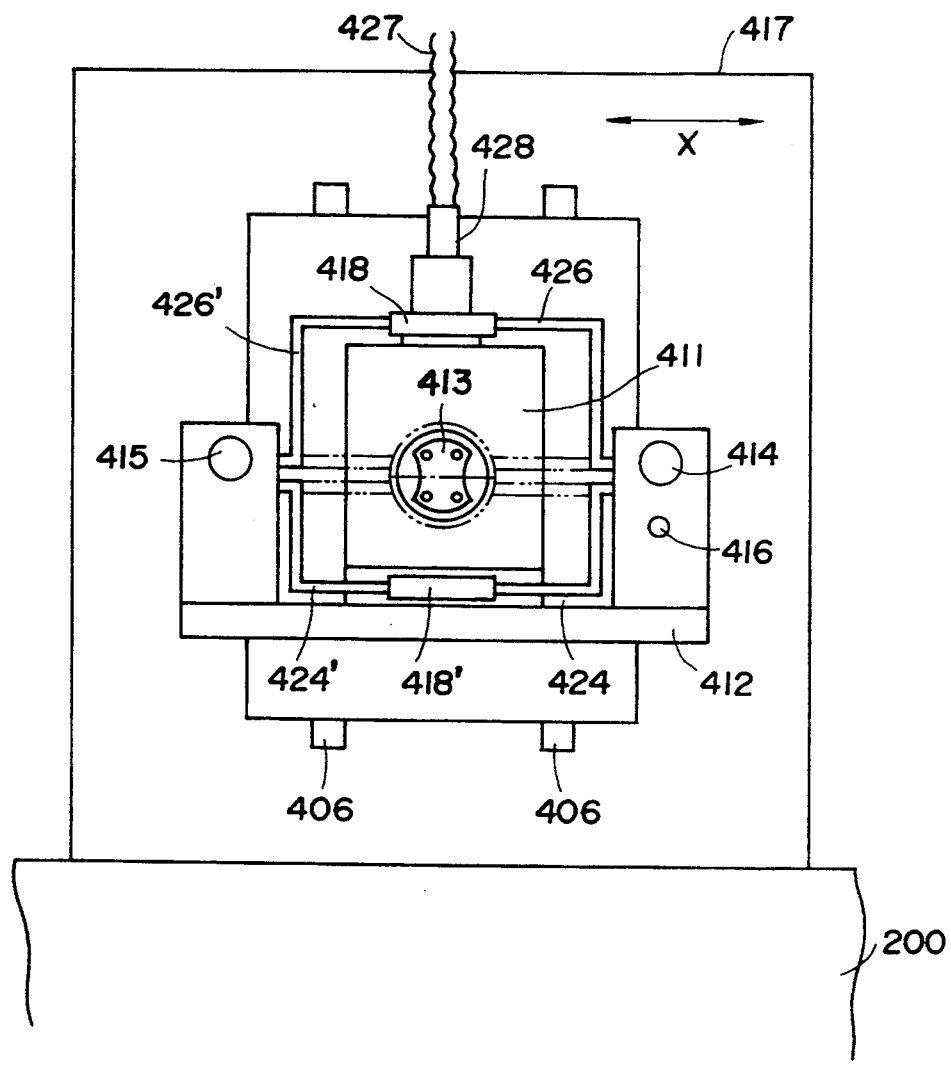
FIG. 9 is an elevational structural diagram showing the connecting equipment on the movable vessel side of the automatic connecting equipment of the present invention.

Item 411 in FIG. 8 is a plug body fixedly provided on support base 412 which is formed integrally with the X-Y table 407. Item 413 as shown in FIG. 8 and FIG. 9, is a plug element whereby connection without voltage is possible by just connecting the plug and the power point. Also, item 414 in FIG. 9 is a guide pin receiver for alignment, provided on the surface of the plug body 411. Item 415 is a pipe coupler and item 416 is a cap guide pin receptacle.

Figure 11:
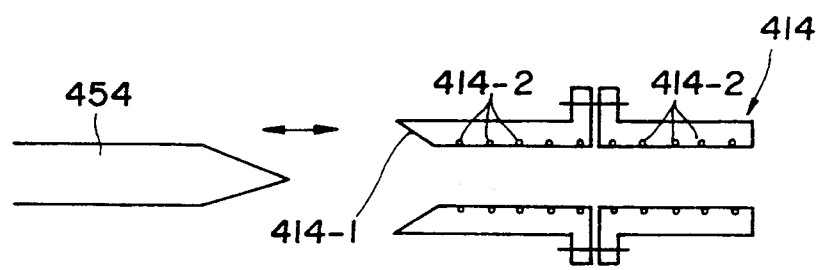
FIG. 11 is a side elevation structural diagram showing components of the automatic connecting equipment showing a relation between an alignment guide pin provided on the station side and a guide pin receiver for alignment of the movable vessel connecting equipment.

As shown in FIG. 11, an insertion hole is formed in the guide pin receiver 414 so that a later mentioned alignment guide pin 454, provided in the station platform, can be insertingly fitted. The insertion hole entry portion is formed as a tapered portion 414-1 opening outwards. Furthermore, inside the insertion hole of the guide pin receiver 414 are arranged a plurality of balls 414-2, 414-2 . . . functioning as bearings arranged in a linear sequence. Now, in this case it may also be possible to have a tubular body which provides a bearing function, connected to the interior of the insertion hole. With the guide pin receiver constructed in this way, insertion and withdrawal of the guide pin 454 may be performed smoothly and easily. Item 417 in FIG. 8 and FIG. 9 is a cover having a canopy which covers the plug body 411 and which is opened forward.

Items 418, 418' in FIG. 8 and FIG. 9 are plug caps. The plug caps 418, 418' normally cover the beforementioned plug element 413 as shown in FIG. 8. When the plug element 413 and the later mentioned power point are connected, then as shown in FIG. 9, the plug caps 418, 418' turn respectively upwards and downwards and the plug element 413 is opened. The opening closing apparatus will be explained based on FIGS. 10A, 10B. The beforementioned plug caps 418, 418' may be elements similar to the one shown in FIG. 10B, having a semi-circular plate shape and attached to ends of the arms 424, 426.

Figure 10A:
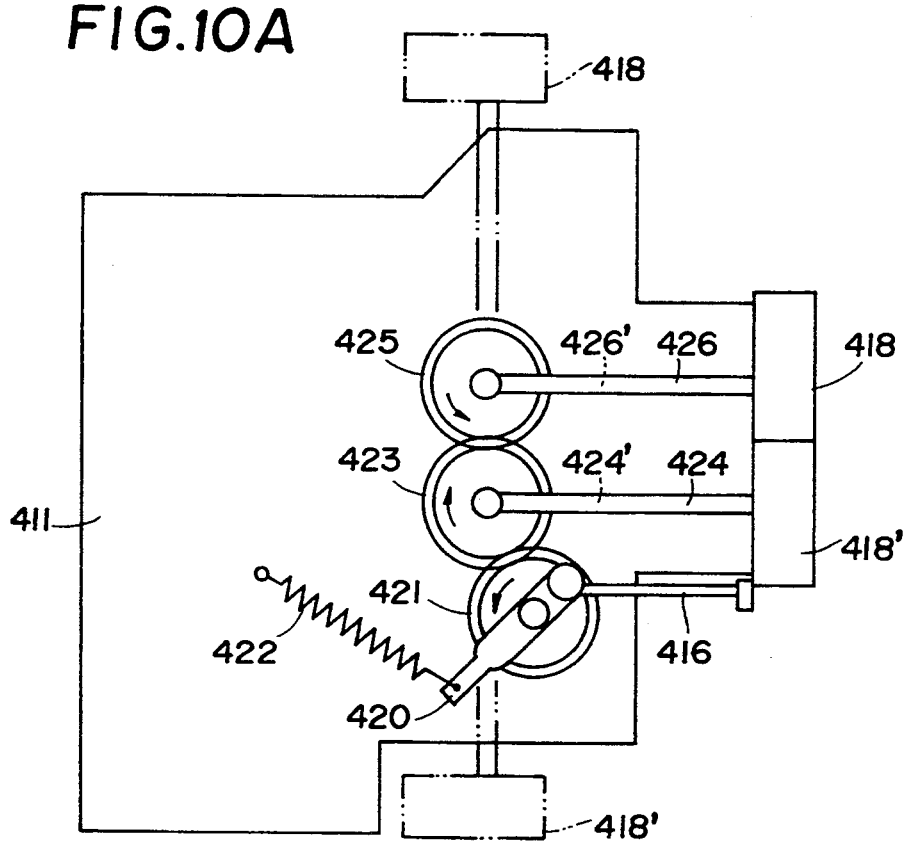
FIG. 10A is a side view showing a moving mechanism for a plug cap of the movable vessel connecting equipment.
Figure 10B:
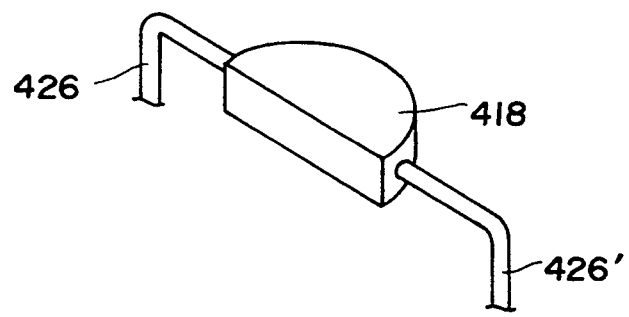
FIG. 10B is a perspective view showing the plug cap.

Item 420 in FIG. 10A is a first arm. The shaft of a first gear 421 is axially fixed in a central portion of the first arm 420 and an upper end of the first arm 420 abuts with the beforementioned cap guide pin receiver 416. The lower end of the first arm 420 is connected to a spring 422 fixed to a rear portion of the plug body 411. Item 423 is a second gear which engages with the first gear 421. Second arms 424, 424' for operating the plug cap, are axially fixed to the shaft of the second gear 423 so as to support plug cap 418' from both sides. The second gear 423 meshes with a third gear 425. Third arms 426, 426' for operating the plug cap, and supported from both sides of the plug cap 418, are respectively fixed to the shaft of the third gear 425 as shown in FIG. 10A, FIG. 10B.

Accordingly, the beforementioned cap guide pin receiver 416 is pushed by a later mentioned cap guide pin 455 on the station platform, thereby turning the first arm 420 counterclockwise. The first gear 421 is also turned counterclockwise by this rotation and the second gear 423 meshing with the first gear 421 is turned in a clockwise direction. The second arms 424, 424' respectively connected to the ends of the shaft of the second gear 423 rotate together with the second gear 423 clockwise and the plug cap 418' attached to the ends of the second arms 424, 424' moves downwards. Further, the third gear 425 meshed with the second gear 423, is turned counterclockwise by rotation of the second gear 423. The third arms 426, 426' fixed to respective ends of the shaft of the third gear 425 also rotate counterclockwise, and the plug cap 418 attached to the ends of the third arms 426, 426' is moved upwards and the plug element 413 is opened.

With retraction of the later mentioned cap guide pin 455 of the station platform, the first, second and third gears 421, 423 and 425 respectively turn in the opposite direction to before under a tension force of the spring 422, and the plug caps 418, 418' move to cover the plug element 413.

Furthermore, with the present embodiment, the opening and closing by swinging of the plug caps 418, 418', is done with the third arms 426, 426', and second arms 424, 424' providing support from both sides of the respective plug caps 418, 418'. However, depending on requirements, arms providing support for just one side of the plug cap may be possible.

Item 427 in FIG. 8 and FIG. 9 is a cabtyre cable and item 428 is a metal fitting for cable connection.

Furthermore, in order to accommodate a three dimensional inclination, in this embodiment a Z table (first table) is provided. As follows the Z table will be described with reference to FIGS. 12A, 12B. FIG. 12A shows an example of a Z table 430. The X-Y table 407 is fixed as one unit with a support base 471 for supporting the plug body 411. A recessed portion 472 is formed in a horizontal direction on a central portion of a vertical side face of the support base 471. At a periphery of the recessed portion 472, a concave slider 473 formed with a concave curved surface is fixedly fitted by means of a fixing element 474 which is attached to the support base 471.

The Z table 430 has a plug body 411 fixedly attached to a side face thereof. Further, a protrusion 475 of a columnar shape, is provided on a vertically aligned central portion of the Z table 430. A convex slider 476, having a convex surface is fixed coaxially on an external periphery of the protrusion 475. The convex slider 476 engages with the concave slider 473 of the central recessed portion 472 of the support base 471. In this way, the Z table 430 is in pressing contact with the support base 471, that is to say the X-Y table 407, through the pressing contact between the surfaces of the convex slider 476 and the concave slider 473. Accordingly, the Z table 430 may be inclined with respect to the X-Y table 407 and hence may accommodate three dimensional operation. In the present embodiment, the support base 471, the concave slider 473, the fixing element 474 and the convex slider 476 make up an all direction rotation device.

Further, the gap between the Z table 430 and the fixing element 474 for fixing the concave slider 473 may have a spring positioned therebetween. The spring may be useful in providing a means of accommodating the inclination of the plug body 411, that is to say, the inclination of the Z table 430.

The embodiment of the Z table 430 functions particularly well when there are many joints to be made.

FIG. 12B shows another embodiment of the Z table 430. Here the X-Y table 407 is formed integrally with the support base 412 for supporting the plug body 411. The central portion of the support body 412 is provided with a columnar shape recess 431. The inner rim of the columnar shape recess 431 has a concave slider 432 formed with a concave surface on an inner periphery, fixed thereto by means of a fixing element 433.

The Z table 430 has a plug body 411 fixed to an upper face thereof. Furthermore, a protrusion 434, formed as a columnar shape, protrudes from a central portion of the Z table 430. A convex slider 435 having a convex surface, is fixed concentrically to an outer periphery of the protrusion 434. The convex slider 435 is engaged with the concave slider 432 fixed to the central portion of support base 412. By the contact of the surfaces of the convex slider 435 and the concave slider 432, the Z table 430 is pressingly contacted with the support base 412, that is to say the X table 407, through both curved surfaces.

A hole 436 is drilled in a central portion of the protrusion 434 of the Z table 430 in a vertical direction. A spring 437 and ball 438 urged by the spring 437 are housed inside the hole 436. The spring 437 and the ball 438 form a ball bearing 440. Further, the ball 438 is held by claws 439 around the entire periphery thereof and the ball 438 is pressingly contacted with the support base 412 by means of the spring 437.

The position where the ball 438 pressingly contacts the support base 412 is formed as a concave portion 441 for contact of the ball 438. Accordingly, the ball bearing 440 restores the incline of the Z table 430, and in cooperation with operation of the convex slider 435, the Z table 430 is normally maintained in a horizontal condition.

Further, the Z table 430 is engaged with the concave slider 432 of the support base 412 through the medium of the convex slider 435 fixed to the external periphery of the protrusion 434 and, by means of the ball bearing 440 on a central lower face of the protrusion 434 of the Z table 430, the Z table 430 is held in position on the support base 412 so as to be tiltable thereto. Furthermore, with regards to the other mentioned portions, the Z table 430 confronts the support base 412 having a small gap therebetween. Accordingly, the Z table 430 can accommodate all three dimensional inclinations and is normally returned to a horizontal position.

Next, is an explanation of the connecting equipment of the station platform with reference to FIG. 13, FIG. 14 and FIG. 15.

Item 442 in FIG. 13 and FIG. 14 is a cylinder fixed on the station platform 10. Item 445 is a slide table (second table) mounted on a power point body 444. As shown in FIG. 14, the slide table 445 has three protruding portions 446, 447, 448 protrudingly formed on a lower surface thereof. The central protruding portion 447 is fixed to an end tip of a piston rod 443 of the cylinder 442, and both side protruding portions 446 and 448 fit with space slidingly into guide grooves 450, 450 provided as recesses in a longitudinal direction on upper surfaces of slide rails 449, 449 provided on the station platform 10.

A power point 452 is provided in a central portion of the face of the power point body 444 which is mounted on the slide table 445. A guide pin 454 and a cap guide pin 455 are provided on one side, and a fixed pipe coupler 453 is provided on the other side with the power point 452 in the center. As shown in FIG. 13, a metal fitting for cable connection 458 for connecting a cabtyre cable 457, is connected to a back portion of the power point body 444, and a contact plate 459 is fixed to an upper face of the power point body 444.

Item 456 is a front face opening boxed shaped cover covering the power point body 444 and the cylinder 442. In the vicinity of an upper front edge of the cover 456 is hangingly suspended a main arm 460. A first arm 461 and a second arm 463 forming a pivotal support 465 are fixedly attached to the end of main arm 460. The other end of the first arm 461 contacts an end portion of the contact plate 459, and the other end of second arm 463 is connected to the power point cap 464. FIG. 15 shows an enlarged view of the cap 464. The power point cap 464 normally covers the power point 452. However, when the plug element 413 of the truck 200 of the movable vessel is connected to the power point 452 of the station platform, the power point body 444 is advanced by operation of the cylinder 442. Accordingly, the contact plate 459 fixed to the upper face of power point body 444, also advances and the first arm 461 fixed to the pivotal support 465 of the main arm 460 contacting the tip of the contact plate 459, advances against the resistance of spring 462 about a center on the pivotal support 465. The second arm 463 fixed to the pivotal support 465 is rotated due to the advance of the first arm 461, and the power point cap 464 fixed to the end of the second arm 463 is removed from the power point 452.

Furthermore, the cylinder 442 operates and if the power point body 444 returns, the contact plate 459 also returns and the first and second arms 461, 463 rotate in an opposite direction to before under the tension force of the spring 462 and the power point cap 464 covers the power point 452.

The beforementioned guide pin 454 (connecting device for alignment) has a pointed tip end portion so as to connect freely with the guide pin receiver 414 (receiving device for alignment) provided in the plug body 411 of the movable vessel truck 200. Further, the piping coupler 453 in the same way is fitted in the piping coupler 415 fixed to the plug body 411 so as to be freely inserted and withdrawn.

Accordingly, operation of cylinder 442 advances the power point body 444 as beforementioned and the cap guide pin 455 is pushed against the cap guide pin receiver 416 on the movable vessel truck 200 and the plug caps 418, 418' are separated from the plug 413. In the same, way under the operation of the contact plate 459 fixed to the upper face of power point body 444, the first arm 461 and the second arm 463 are moved, and the power point cap 464 attached to the tip of the second arm 463 is separated from the power point 452.

The automatic connecting equipment of the present invention is constructed as above. The guided vehicle carries the movable vessel 201 along the guide course and is positioned by stopping at a predetermined position in the vicinity of the station platform 10. The transfer equipment then operates and the movable vessel truck 200 is transferred to the station platform 10 at which position the power point 452 on the station platform 10 faces the plug 413 on the movable vessel truck 200.

By operation of the cylinder 442 acting as a slide drive source, provided on the station platform 10, the slide table 445 on the end of the piston rod 443 of the cylinder 442 advances along the guide grooves 450, 450 of the slide rails 449, 499.

At this time, the contact plate 459 fixed to the upper face of the power point body 444, at first pushes against the first arm 461 contacting the end portion of the contact plate 459. Then, by the advance of the power point body 444, the second arm 463 is turned upward due to the advance of the first arm 461, and the power point cap 464 on the end of the second arm 463, that up until then covered the power point 452, is separated from the power point 452, opening the power point 452. Furthermore, by the advance of power point body 444, the cap guide pin 455 comes into contact with the cap guide pin receiver 416 provided in the plug body 411 of the movable vessel truck 200. Subsequently, with pressing contact, the first gear 421 housed within the plug body 411 is rotated counter clockwise. Then, the second and third gears 423, 425 meshed with the first gear 421 rotate respectively. This rotation causes the plug caps 418, 418' to move in respective upward and downward directions by way of the second arm 424 and the third arm 426, and the plug element 413 that has until then been covered by the plug caps 418, 418' is opened.

On the other hand, the end of the guide pin 454 (connecting device for alignment) fixed to the power point body 444 has a sharpened end. The guide pin 454 is inserted in the guide pin receiver 414 (receiving device for alignment) of the plug body 411 of the movable vessel truck 200. The opening of the insertion hole of the guide pin receiver 414 is formed as a tapered portion opening towards the outside. Accordingly, with contact arising on insertion of the guide pin 454, even if there is misalignment between both components, the guide pin 454 can be fully inserted into the guide pin receiver which can accommodate misalignment of the guide pin 454 in all directions. This is because the plug body 411 to which the guide pin receiver 414 is fitted, is free to move in three dimensions, since it is mounted on the X-Y table 407, and the Z table 430, and the X-Y table 407 can slide freely in a vertical direction and a horizontal direction, and the Z table 430 is free to slide and to incline in a three dimensional direction. Further, at the same time as the above, the pipe coupler 453 and pipe coupler 415 are also fully connected. As a result, the plug 413 of the movable vessel 200, within the operating limit of the cylinder 442, can be completely inserted into the power point 452 of the station platform 10. In this position, the connection of the interlock switch under voltage free connection at the power point comes ON thereby completing connection. In the anti-release safety condition, it is possible to supply power, and also to supply compressed air, pressurized oil and fluid by way of the piping coupler.

With the occurrence of a disconnect command, the cylinder 442 operates, the slide table 445 starts to return, and the power point body 444 starts to move in a direction to separate from the plug body 411. At first the interlock switch under voltage-free connection, of the power point 452 goes to OFF and the power point 452 is disconnected from the plug 413 in a voltage-free condition. Then, the alignment guide pin 454 separates from the guide pin receiver 414 and the piping couplers 453 and 415 are respectively released. Since the cap guide pin 455 returns at this time, the first arm 420 is turned by the tension force of the spring 422 connected to first arm 420, and the first gear 421 is rotated in a clockwise direction. As a result, the second gear 423 meshed with the first gear 421, and the third gear 425 are rotated respectively so that the second and third arms 424, 426 are turned and the plug 413 is covered by the plug caps 418, 418'.

Further, similar to the above, the power point body 444 returns, and by the tension force of spring 462 suitably provided between the cover 456 and the first arm 461, the second arm 463 attached to power point cap 464 is turned down about the pivot portion 465, thereby covering the power point 452 and completing the disconnection operation.

Further, instead of the tight sealing type or the anti-release type plug 413 fittingly attached to X-Y table 407, Z table 430, a compressed air or pressurized oil or similar fluid receiving connection may be fittingly attached. In the same way instead of the tight sealing type or anti-release type power point 452 attached to the slide table 445, a supply source connection device may be fitted. By connection of the above mentioned pressure receiving connection device and the supply source connection device, compressed air or pressurized oil may be supplied to the movable vessel. At the time of connection, even if misalignment occurs between the two bodies, this can be corrected for by movement of the X-Y table/Z table which covers all directions, in a similar way to the beforementioned embodiment.

Further, with connection/disconnection and interlocking of the respective connectors for the power point and plug, and the connectors on the pressure receiving side and the supply source side, the front faces of the power point and plug, and the pressure source side connectors and discharge side connectors are covered by means of the slide drive source, and the caps are opened and closed in a similar way to the beforementioned embodiment.

Conventionally, the power source to the movable vessel, and the compressed air and pressurized oil supply, were a system involving movable cables or storage batteries, and compressed air and pressurized oil storage tanks. Accordingly, the range of movement of the movable vessel and the actual working period was limited. Also applications to dangerous goods handling processes were restricted. As a result, utilization for advanced movable vessel multi-purpose batch processors was a problem. However with the above mentioned embodiment, various electrical equipment and the like can be carried on the movable vessel, so that advanced automation and flexible operation of movable vessel type multi-purpose batch processor systems becomes possible. Further, the system is also applicable to handling processes for dangerous goods, without being limited.

In the present embodiment, the X-Y table/Z table have been described as equipment on the movable vessel side. However, these may be on the station platform side. The embodiment has been described with the guide pin fixed to the slide table on the station platform side, and the guide pin receiver provided on the X-Y table/Z table. However it is possible for the guide pin to be on the X-Y table/Z table and the guide pin receiver to be on the slide table.

Further, the compressed air and oil pressure connection plugs may be attached, together with the plug element, to the X-Y table/Z table, and the power point, and compressed air and oil pressure connection plugs may be affixed to the slide table, so that while adjusting misalignment using the alignment guide pin and X-Y table/Z table, the power source and compressed air may be automatically connected/disconnected simultaneously.

Further, the cylinder attached to the station platform has been described as the drive source for the slide table. However, it is of course also possible for the slide table to be driven by the transfer equipment for transferring the truck with movable vessel from the guided vehicle to the station platform, or returning the truck with movable vessel from the station platform to the guided vehicle.

Also, apart from the beforementioned power point for power source connection and/or the compressed air connection plug, the system may also be applicable to power points for control, general piping connection plugs such as for connection of fluid supply piping and the like, and multiple type automatic connecting equipment, and has the same desirable applications.

Now, although a part of the above description may be repeated, in order to clearly explain the range of the present invention, possible assemblies for each element in the above automatic connecting equipment will be explained. In the above embodiment there was an adjustment device for directions perpendicular to the connection direction of the power point plug, an adjustment devices for the direction parallel to the connection direction, and a device for inclination in all directions. All of these devices were shown for the case of installation on the first table (Z table). However, conversely, all of these devices may be installed on the second table (slide table). Further, the above three devices may be allotted as appropriate between the first table and the second table.

A washing equipment embodiment according to the present invention will now be explained with reference to the drawings.

Figure 16:
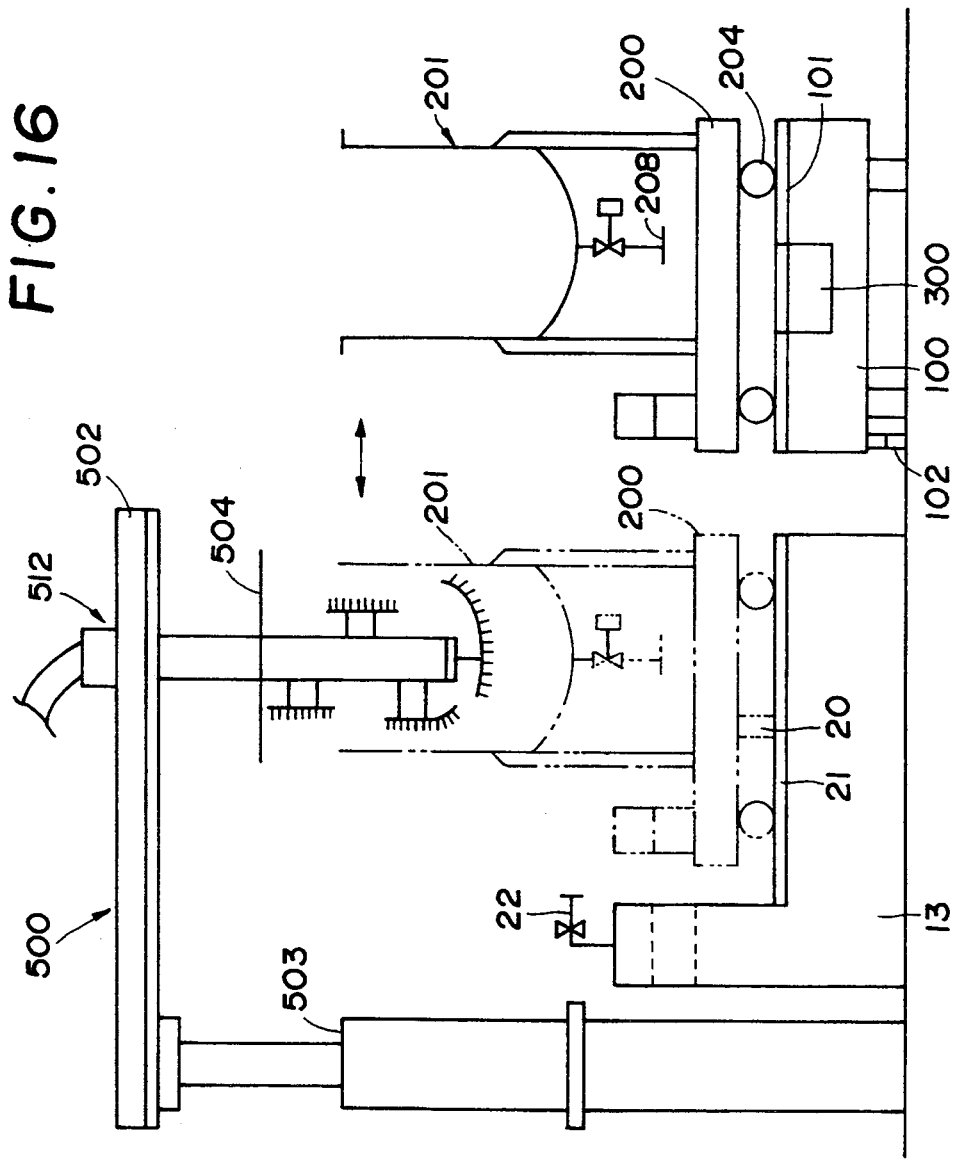
FIG. 16 is a schematic structural diagram showing a washing equipment of an embodiment of the present invention.

The washing equipment according to the present invention is shown in FIG. 16. In FIG. 16 the guided vehicle 100 loaded with the movable vessel 201 with the truck 200 runs along the guidance track and is stopped at a predetermined position in the vicinity of a washing station platform 13 by means of a position location apparatus 102.

The beforementioned transfer equipment 300 installed on the guided vehicle 100 operates, and the rails 101 laid on the guided vehicle 100 in a direction perpendicular to the guidance track, are lined up by means of the position location apparatus 102 with the rails 21 on the washing station platform 13 so that the wheels 204 of movable vessel 201 can run along the rails 21 and transfer of the truck 200 of movable vessel 201 to the washing station is completed. The positing apparatus 20 on the station operates stopping the truck 200 at a predetermined position.

A washing station support arm 502 disposed on the washing station 13 lowers slowly as a result of operation of the drive cylinder 503 to be mentioned later, and after the vessel 201 is sealingly closed with a cover 504, the lowering of the support arm 502 is stopped. Washing of the vessel 201 is then performed. At the time of washing, a discharge pipe 208 at the bottom of the vessel 201 and a discharge pipe 22 on the washing station platform 13 are connected by automatic pipe connecting equipment (not shown in the drawing) and the washing fluid is discharged to an external system.

On completion of washing of the vessel 201, the guided vehicle 100 once more moves to a predetermined position in the vicinity of the washing station platform 13 and stops. Then, the transfer equipment 300 operates and the movable vessel 201 is returned from the washing station platform 13 to the guided vehicle 100, and the guided vehicle 100 loaded with the movable vessel 201 moves to another station in order to perform another operation.

Next, an outline of the whole body of the washing apparatus 500 shown in FIG. 17 will be explained. A drive cylinder 503 is mounted in the vicinity of the washing station platform 13, inside a support column 505. A head portion of a piston 506 of the drive cylinder 503 is fixed to a plate shaped support arm 502. Item 507 in the drawing is an oil tank for the drive cylinder and item 508 is an oil pump.

A cylindrical case 509 is perpendicularly provided at the other end of the support arm 502. A cover 504 for the vessel 201 is fixed to a lower end rim of the case 509. Items 513 and 514 are a gas discharge port and a nitrogen inlet respectively, provided in the cover 504. Item 510 is an internally open angled support case with the plate shaped support arm 502 as a bottom portion. A motor 511 is provided at one end of the upper portion of the support case 510, and a rotation connection 512 is provided at the other end.

A drive shaft 516 is connected to the rotation connection 512 so as to rotate freely. The drive shaft 516 has a central portion for a washing fluid passage 515 drilled out down to close to a bottom end portion thereof. A follower shaft 517 is snugly disposed around an outer periphery of the drive shaft 516 so as to rotate freely thereabout. The follower shaft 517 hangs down centrally inside the beforementioned cylindrical case 509 perpendicularly disposed on the arm 502.

Figure 18:
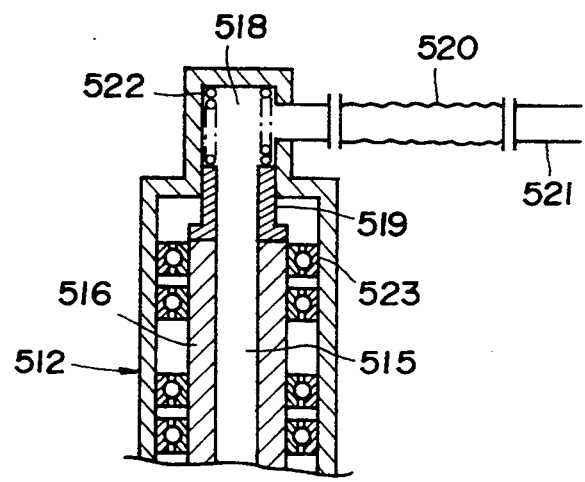
FIG. 18 is an enlarged sectional view showing a connection portion of a revolving body of the washing equipment of the present invention.

With the rotation connection portion 512, as shown in FIG. 18, the head portion of the drive shaft 516 is connected to the rotation connection 512 by way of the washing fluid passage 515 drilled in the drive shaft 516, a seal 519, and a washing fluid inlet 518. The washing fluid inlet 518 is connected to the washing fluid tube 521 by way of a flexible tube 520. A spring 522 is disposed inside the washing fluid inlet 518 and maintains an urging force on the seal 519.

Items 523, 523 . . . in the drawing are bearings.

Figure 19:
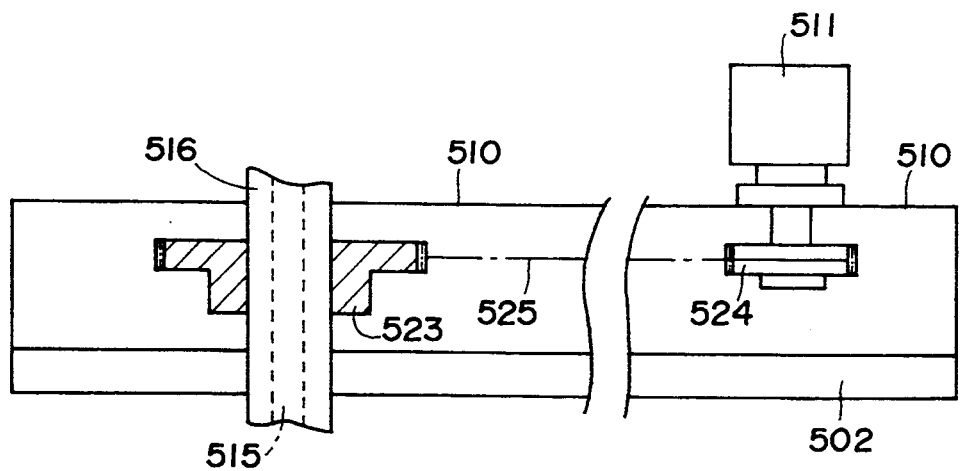
FIG. 19 is a sectional view showing a drive mechanism for a drive shaft of the washing equipment of the present invention.

The drive shaft 516, as shown in FIG. 19, is rotated by the motor 511. A pulley 523 housed in the angled support case 510 fixed to the support arm 502 is fixedly attached to the drive shaft 516. The pulley 523 is connected to a pulley 524 fixed to the shaft of the motor 511 provided in the upper end portion of the angled support case 510, by means of a belt 525. Accordingly, the drive shaft 516 is rotated by operation of the motor 511.

As shown in FIG. 18, the washing fluid is supplied to the washing fluid inlet 518 in the head of the rotation connection portion 512 by way of the flexible tube 520 supplied from the washing fluid pipe 521. The washing fluid flows into the washing fluid passage 515 drilled in the drive shaft 516 which is rotated by the motor 511. At this time, the seal 519 is urged against the drive shaft 516 by the spring 522 so that the washing fluid flows into the washing fluid passage 515 without any leakage.

Figure 17:
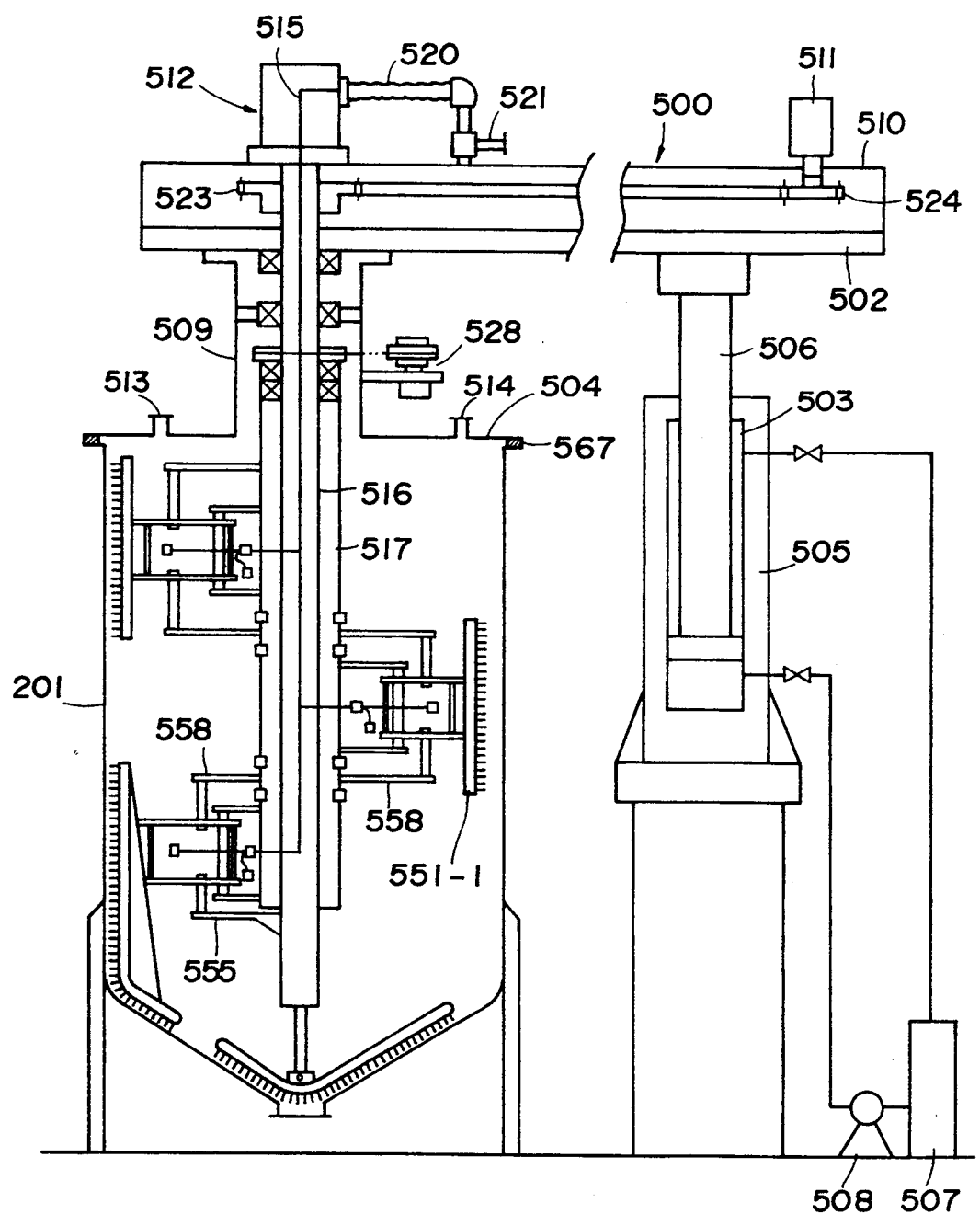
FIG. 17 is a side sectional view showing the washing equipment of an embodiment of the present invention.
Figure 20:
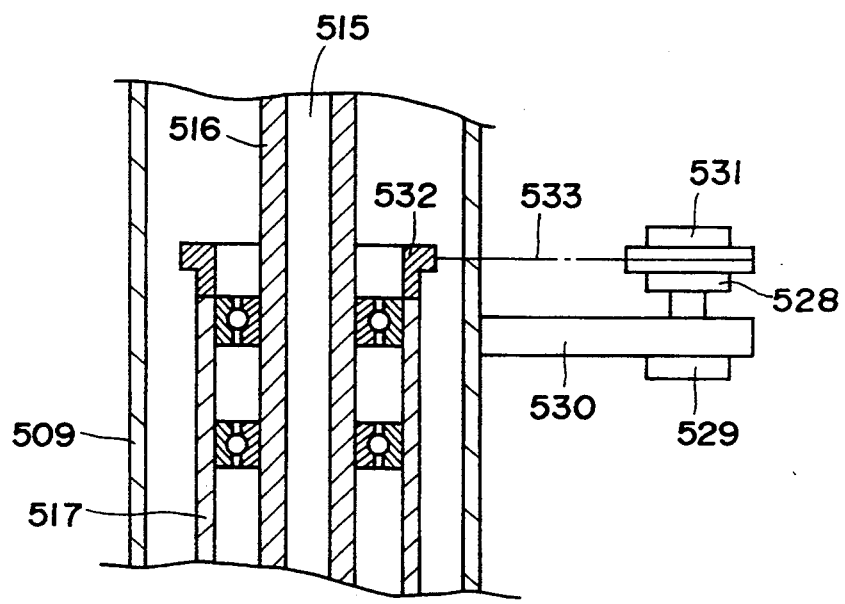
FIG. 20 is a sectional view showing a braking mechanism of the washing equipment of the present invention.

As shown in FIG. 17, the cylindrical case 509 formed integral with the cover 504 is perpendicularly provided on one end of the support arm 502. The follower shaft 517, with the drive shaft 516 inserted inside, hangs perpendicularly down inside the cylindrical case 509. As shown in FIG. 20, a supporting platform 530 provided with a torque keeper 528, and a cam clutch 529 is fixedly attached to a wall of the cylindrical case 509. A sprocket 531 fixedly attached to a shaft of the torque keeper 528, is connected to a sprocket 532 fixed to an upper end of the follower shaft 517 by way of a chain 533. With this control mechanism, when the follower shaft 517 rotates in a counterclockwise direction, this rotation is transmitted from the sprocket 532 by way of the chain 533 to the torque keeper 528. The torque keeper 528 is locked to the supporting platform 530 by the cam clutch 529 thereby applying a brake to the follower shaft 517.

Next, the washing portion at the bottom end of the drive shaft 516 will be explained with reference to FIG. 21. The bottom most portion of the drive shaft 516 is drilled from the bottom with a cylindrical hole 535. A slide shaft 536 is provided in the cylindrical hole 535 and engaged with the drive shaft 516 so as to rotate together with the drive shaft 516 yet slide freely in a vertical direction. A brush holder 537 provided with a pin 538 in its end tip, is vertically provided at a lower end of the slide shaft 536, and is connected to a brush attachment plate 540 fitted with a brush 539 by means of the pin 538. Item 541 is a stopper provided at a bottom end of the cylindrical hole 535 for preventing the slide shaft 536 from coming out.

As mentioned above, the drive shaft 516 is disposed inside the follower shaft 517 with a very small gap therebetween, and a lower end portion of the follower shaft 517, at a position above the bottom of the cylindrical hole 535, fits freely around the drive shaft 516 so as to allow rotation therein. Also the washing fluid passage 515 is drilled down in the drive shaft 516 to a location slightly above the follower shaft lower end free fitting portion.

Figure 21:
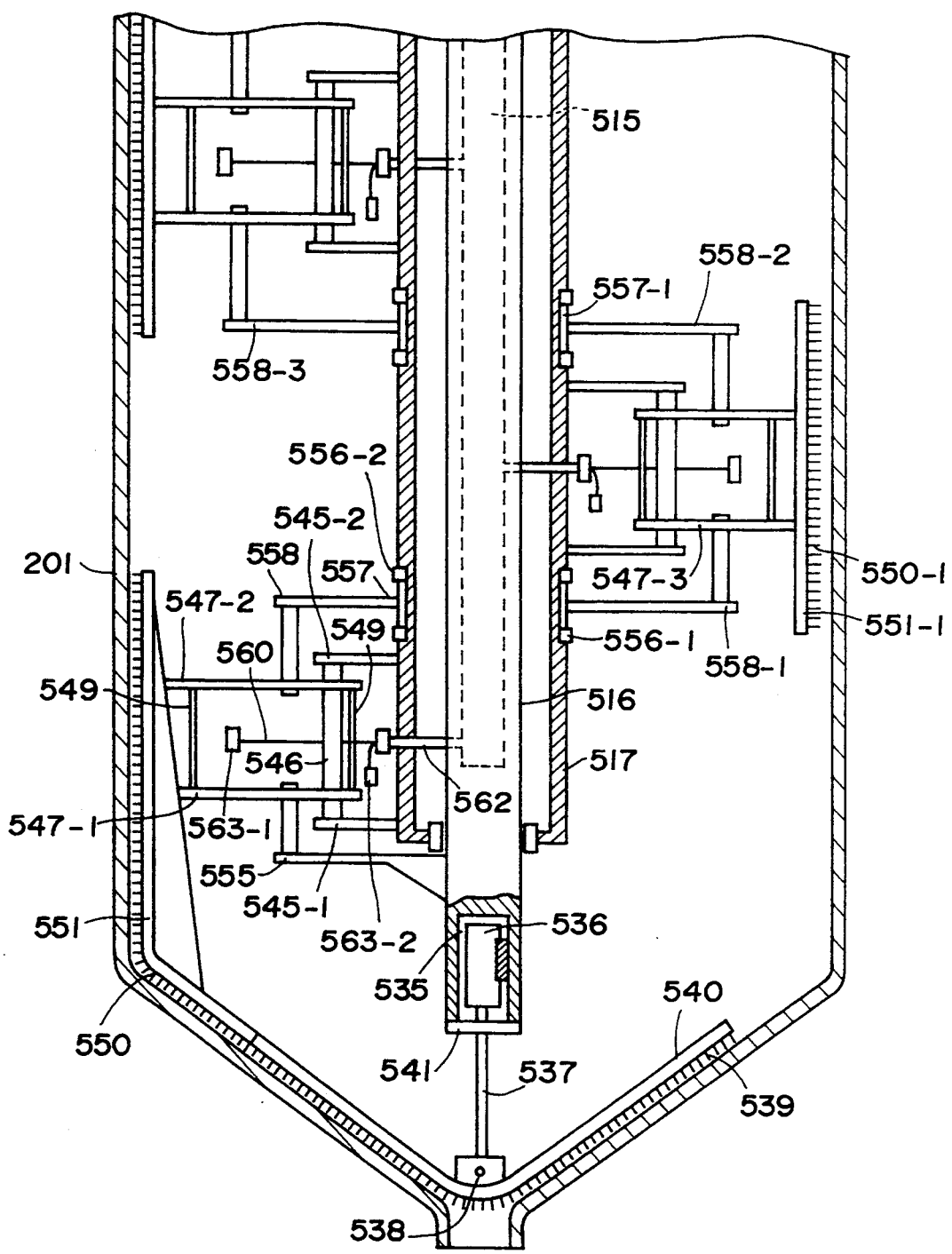
FIG. 21 is a side sectional view showing a washing portion of the washing equipment of the present invention.
Figure 22:
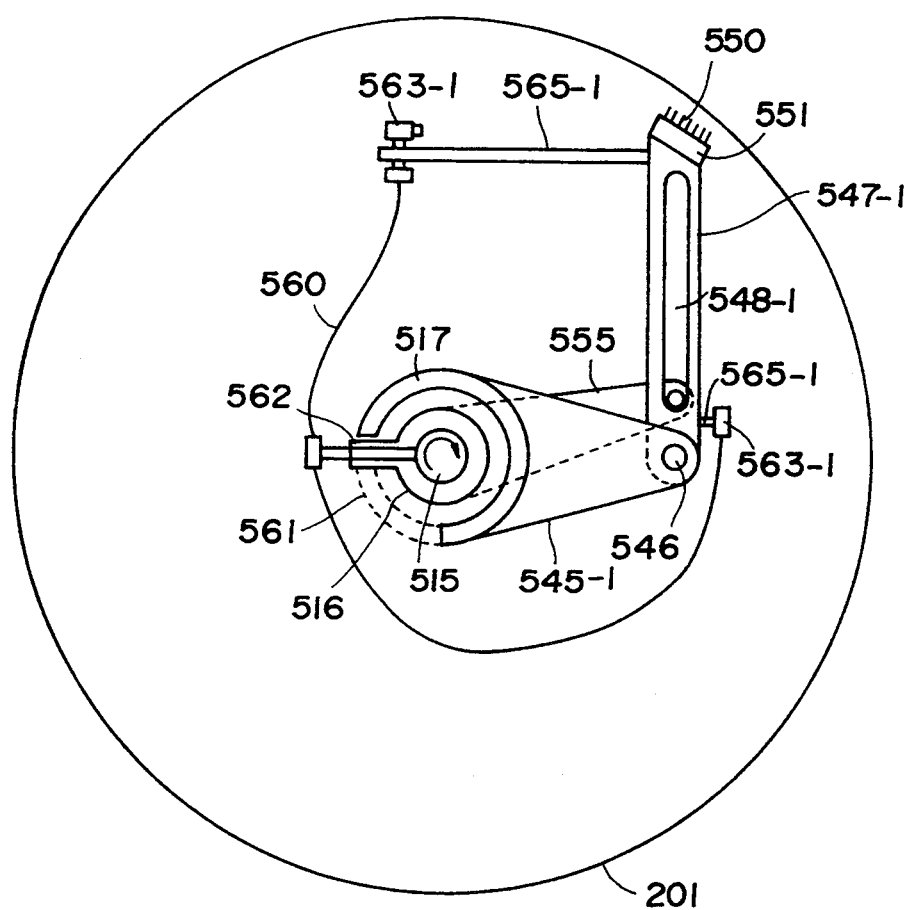
FIG. 22 is a transverse sectional view showing the washing portion of the washing equipment of the present invention.

As shown in FIG. 21 and FIG. 22, items 545-1, 545-2 are follower arms provided on the follower shaft 517 at a predetermined distance apart and in a perpendicular direction thereto, and located in the vicinity of the lower end of the follower shaft 517. An arm shaft 546 is axially supported so as to turn freely, at end portions of the follower arms 545-1, 545-2 thereby connecting both follower arms. Items 547-1, 547-2 in the drawing are brush holders drilled with respective elongated slide holes 548-1, 548-2 in a longitudinal direction thereof. The brush holders 547-1, 547-2 are freely fitted to the arm shaft 546 so as to rotate freely and are disposed parallel to each other at a predetermined distance apart. Both brush holder 547-1, 547-2 are connected together by a plurality of supports 549, 549, . . . to ensure strength.

A brush attachment plate 551, with a brush 550 attached thereto, is attached to end portions of the brush holder 547-1, 547-2. The brush attachment plate 551 is shaped so as to match the shape of the inner wall of the vessel 201.

Item 555 in the drawing is an L-shaped drive arm standingly provided on and perpendicular to the drive shaft 516 at a location a little below the free fit portion of the follower shaft 517 at the lower end of the drive shaft 516. The tip of the drive arm 555 is freely fitted in the elongated slide hole 548-1 of brush holder 547-1.

Accordingly, the drive arm 555 is engaged with the brush holder 547-1.

As mentioned above, the follower arms 545-1, 545-2 are standingly provided on the follower shaft 517. As shown in FIG. 21, collars 556-1, 556-2 are snugly fitted to the follower shaft 517 at a position a little above the position of the upper follower arm 545-2. A rotation pipe 557 with follower shaft 557 disposed inside is provided between the collars 556-1, 556-2, so as to be freely rotatable with respect to the follower shaft 517. A second L-shaped drive arm 558 is standingly provided on and perpendicular to the rotation pipe 557. The tip of the second drive arm 558 fits freely in the elongated slide hole 548-2 drilled in the brush holder 547-2, so that the second drive arm 558 is engaged with the brush holder 547-2.

Item 560 in the drawing is a washing liquid spray tube connected to a discharge port 562 disposed in a cutout 561 (see FIG. 22) in the follower shaft 517. The discharge port 562 pierces the drive shaft 516 and connects with the washing fluid passage 515 drilled inside the drive shaft 516. Respective ends of the spray tube 560 are fixedly attached to a plurality of spray nozzles 563-1, 563-2, . . . which face an inner wall of the vessel 201.

Accordingly, with clockwise rotation of the drive shaft 516, the follower shaft 517 which is connected by means of the drive arm standingly provided on the drive shaft 516 and the follower arm, also rotates clockwise. With the rotation of the drive arm 555, the brush holders 547-1, 547-2 and the second drive arm 558 connected thereto also rotate through the action of the arm shaft 546. The brush attachment plate 551, to which the brush holders 547-1, 547-2 are attached, also rotates and the inner wall of the vessel 201 is cleaned by the brush 550.

To describe the above operation in more detail, the end portions of the follower arms 545-1, 545-2 fixed perpendicular to the follower shaft 517, provide a connection by way of the arm shaft 546, whereby the brush holders 547-1, 547-2 may turn freely thereabout. The end portion of the drive arm 555 which is perpendicularly attached to the drive shaft 516, fits freely into the elongated slide hole 548-1 of the lower of the two brush holders, that is the brush holder 547-1. Further, the second drive arm 558 with an end portion freely fitting into the elongated slide hole 548-2 formed in the upper brush holder 547-2, is standingly attached to the rotation tube 557 disposed around the outside of the follower shaft 517 so as to rotate freely about the follower shaft 517. Accordingly, with clockwise rotation of the drive shaft 516, the drive arm 555 also rotates in the direction of the arrow in FIG. 22. The drive arm 555 moves along the elongated slide hole 548-1 of the brush holder 547-1 and as the rotational speed of the drive shaft 516 increases the brush holder 547-1 also rotates in a clockwise direction under the effect of centrifugal force. When the tip of the drive arm 555 reaches the bottom end of the elongated slide hole 548-1, the follower shaft 517, and follower arms 545-1, 545-2 also rotate in the same way. The brush holders 547-1, 547-2 open under the above mentioned centrifugal force and the brush 550 fixedly attached to these, contacts against the inner wall of the vessel 201 and cleaning, to be discussed later, is performed with the spraying of washing liquid from the nozzles 563-1, 563-2.

With the opening of the brush holders 547-1, 547-2 according to the present specification, the angle between the follower arm and the brush holder opens, that is to say the angle between the two increases. This is referred to as opening. Also, in reverse, with the decrease in the angle, that is to say becoming narrower, this is referred to as closing.

In order to ensure smooth opening and closing of the brush holders 547-1, 547-2, it is desirable that at the opening limit of the brush holders 547-1, 547-2, the angle between the follower arm and the brush holder is approximately 90 degrees. When the opening limit is reached it is preferable if the end of the drive arm 555 and the lower end of the elongated slide hole 548-1 of the brush holder 547-1 have a slight clearance therebetween. At this time, as shown in FIG. 22, the washing fluid discharge port 562 is positioned inside the cutout 561 formed in the follower shaft 517, so as not to contact the follower shaft 517.

The discharge port 562 is connected perpendicularly to the washing fluid passage 515 drilled in the drive shaft 516. The other end is connected to the spray tube 560. The spray tube 560 branches and the branches are supported by the nozzle supports 565-1, 565-2 fixedly attached to the brush holder 547-1. The respective nozzles 563-1, 563-2 are attached to the nozzle supports 565-1, 565-2 so as to face in predetermined directions and spray washing fluid at the washing fluid supply pressure, over a predetermined range. Further, as mentioned above and as shown in FIG. 22, the cutout 561 is provided over approximately one quarter of the circular periphery of the follower shaft 517 so that the discharge port 562 is able to move freely within this cutout portion 561.

As mentioned before, the brush 550 contacts the inner wall of the vessel 201 thereby cleaning the interior of the vessel 201. On completion of cleaning, the clockwise rotation of the drive shaft 516 is temporarily stopped, and the drive shaft 516 is rotated in a counterclockwise direction as shown by the direction of the arrow in FIG. 23. This rotation is transferred to the follower shaft 517, and the rotation of the follower shaft is transmitted from the sprocket 532 fixed to the follower shaft 517 to the torque keeper 528 from the sprocket 531 by means of the chain 533. As a result, the cam clutch 529 locks and the torque keeper 528 operates providing a braking effect to the follower shaft 517.

Figure 23:
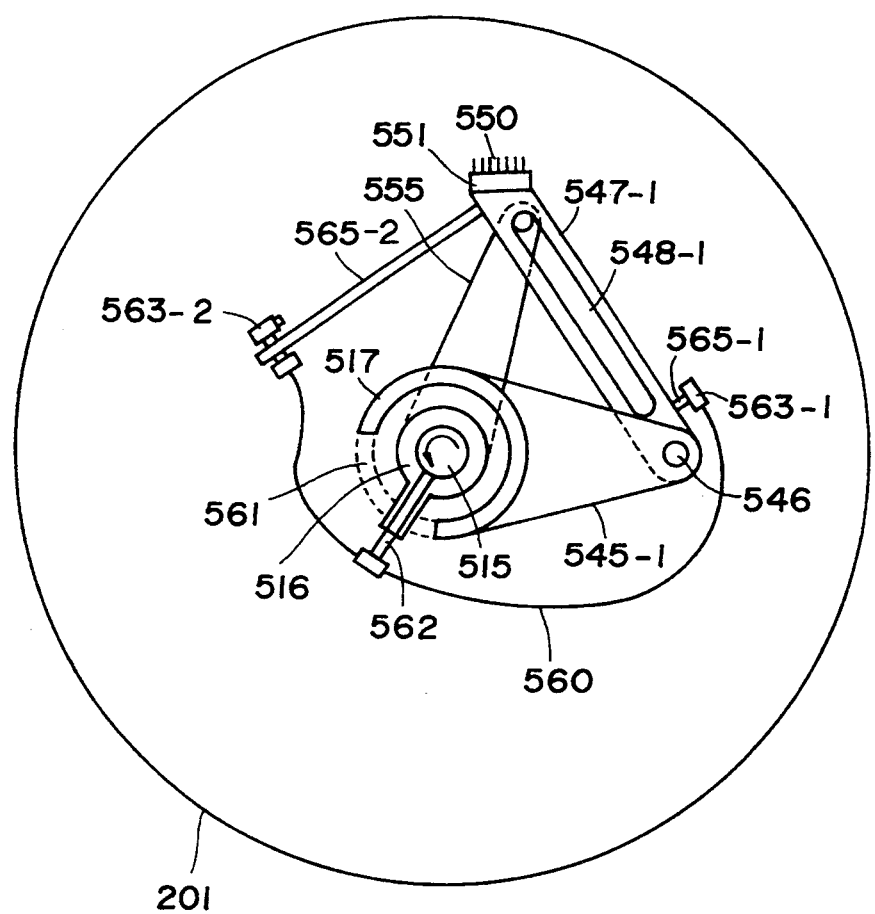
FIG. 23 is a transverse sectional view showing a contracted condition of the washing portion of the washing equipment according to the present invention.

On the other hand, the second arm 558 is perpendicularly attached to the rotation pipe 557 which is free to rotate on the follower shaft 517, and the drive arm 555 is perpendicularly attached to the drive shaft 516. Consequently, a braking effect on the follower shaft 517 results in a difference in rotation between the follower arms 545-1, 545-2 perpendicularly attached to follower shaft 517, and the drive arm 555. As a result, the end of drive arm 555 moves along the elongated slide hole 548-1 in the brush holder 547-1, and as shown in FIG. 23, the brush holder moves in a circular path and the brush holder closes.

A third drive arm 558-1 is standingly provided on the rotation pipe 557 on an opposite side to the second drive arm 558 standingly provided on the rotation pipe 557, and with the drive shaft 516 disposed in between. An end of the third drive arm 558-1 slidingly fits into an elongated slide hole formed in a brush holder 547-3. A brush attachment plate 551-1 fitted with a brush 550-1 is fixedly attached to an end portion of the brush holder 547-3 and a mechanism similar to that of the beforementioned washing mechanism is provided. Drive is effected by rotation of the second drive arm 558 of the beforementioned washing mechanism being transmitted to the third drive arm 558-1 by way of the rotation pipe 557.

Further, in a similar way, a fourth drive arm 558-2 is substantially perpendicularly provided on a rotation pipe 557-1, and a fifth drive arm 558-3 is standingly provided substantially perpendicularly on the rotation pipe 557-1 at a position opposite to the fourth drive arm 558-2. A washing mechanism similar mechanism to the beforementioned washing mechanism is provided so as to wash the inner upper wall of the vessel 201.

Accordingly, the washing mechanism of the present embodiment, in order to completely wash every part of the vessel 201 interior that is to say the four places comprising the bottom, the lower side, the side wall and the upper wall, has the drive arm 555 standingly provided on the drive shaft 516, the follower arms standingly provided on the follower shaft 517 and the second drive arms standingly provided on the rotation pipes 557. Accordingly, with clockwise rotation of drive shaft 516, the follower shaft 517 also rotates in conformity. At this time the torque keeper 528 becomes free so that the rotational speed increases giving a centrifugal force function. Consequently, the brush holders 547-1, 547-2 that are connected to the follower arms 545-1, 545-2 standingly provided on the follower shaft 517 by means of the arm shaft 546 so as to be freely rotatable, open and the brush 550 attached to the brush holders 547-1, 547-2 by means of the brush attachment plate 551, cleans the inner wall of the vessel 201.

Further, with counterclockwise rotation of drive shaft 516, the rotation is transmitted to the torque keeper 528 by way of the chain 553 from the sprocket 532 fitted to the follower shaft 517, and the cam clutch 529 is locked, thereby applying braking to the follower shaft 517. As mentioned before, a rotational difference occurs between the drive arm 555 and the follower arm 545, and the brushes close in sequence from the lower brush holder.

The washing apparatus of the present embodiment is constructed as above. In discussing the operation, at first the guided vehicle loaded with the movable vessel 201 stops at a predetermined position in the vicinity of the washing station platform 13. Then, the transfer equipment 300 of the guided vehicle 100 operates and the truck with movable vessel 200 is transferred to the washing station 13. The support arm 502 operated by the drive cylinder 503 then lowers and the drive shaft 516 hanging down from the support arm 502, and the follower shaft 517 with the drive shaft 516 freely inserted therein as well as the washing mechanism fixed to the drive shaft 516 and the follower shaft 517, are also lowered, and the vessel 201 is sealingly closed by the cover 504. At this time, the brush holders 547-1, 547-2 of the washing mechanism are in a closed condition. Also, since there is a packing 567 around the complete periphery of the lower face rim of the lid 504, the sealing of the interior of vessel 201 is adequately maintained. Furthermore, as a safety measure, inert gas such as nitrogen may be introduced as required through the nitrogen inlet 514 in the lid 504. Thus it is possible to carry out the washing operation with gas discharging from the gas discharge port 513.

In the first step of the operation, the motor 511 operates and the drive shaft 516 is rotated through a reduction gear. The rotation is transmitted to the follower shaft 517 by way of the drive arm 555 and the follower arms 545. The rotation is then transmitted to the torque keeper 528 from the sprocket 532 fixed to the follower shaft 517 by way of the chain 533. Since the cam clutch 529 is free and the follower shaft 517 also rotates in conformity. In this step, since the centrifugal force is small, the brush holders 547-1, 547-2 do not yet open. On the other hand, the washing fluid is supplied from the washing fluid pipe 521, and passes through the liquid passage 515 in the drive shaft 516, and by way of the discharge port 562, is sprayed onto all the interior wall regions of the washing vessel from the nozzles 563-1, 563-2 . . . provided at the end tips of spray pipe 560. In consideration of safety measures, the washing fluid may be sprayed as required under electrostatic-proof operating conditions.

After washing the interior wall of the vessel for a predetermined period with just the jets of washing fluid, the rotational speed of the drive shaft 516 is increased for the second stage. Since at this time the beforementioned cam clutch 529 is free, the follower shaft also rotates together with the drive shaft 516. The tip of the drive arm 555 standingly provided on the drive shaft 516, moves along the elongated slide hole 548-1 of the lower brush holder 547-1 and with the additional centrifugal force, the brush holders 547-1, 547-2 open. As a result, the brush 550 attached to the brush attachment plate 551 which is fixed to an end of the brush holders 547-1, 547-2, contacts with the inner wall of the vessel 201 and due to the spraying of washing fluid, the walls of the vessel may be completely washed. In this case, the nozzles 563-1, 563-2 are attached in a position to face towards a position directly ahead of the brush 550 in the direction of rotation of the brush 550, and also directly towards the brush itself, so that when the washing fluid sprays it is possible for the brush to be washed at the same time as the washing of the vessel inner wall.

With regards to washing the bottom portion of the vessel 201, the slide shaft 536 provided in the cylindrical hole 535 drilled in the bottom end of the drive shaft 516, rotates together with the drive shaft 516, and also is slideable in a vertical direction. As a result, the brush 539 fixed to the brush attachment plate 540 attached by means of the pin 538 to the brush holder 537, cleans the complete lower region of the vessel while being in movable contact therewith.

After washing for a predetermined period, in a third step the motor 511 is switched off, and after the drive shaft 516 stops rotating, the drive shaft 516 is rotated in a counterclockwise direction. This rotation is transmitted to the torque keeper 528 by way of the chain 533 from the sprocket 532 which is fitted to the follower shaft 517, and the cam clutch 529 locks to the supporting platform 530. As a result, the follower shaft 517 is braked by way of the torque keeper 528, so that the angular difference between the drive arm 555 standingly provided on the drive shaft 516, and the follower arm 545-1 standingly provided on the follower shaft 517, changes. As a result, the end tip of the drive arm 555 moves along the elongated slide hole 548-1 in the lower side brush holder 547-1, and the brush holder closes and the brush 550 separates from the inner wall of the vessel 201.

The washing operation is not limited to the sequence of washing with the washing fluid only then washing with the brush, and depending on the contamination of the vessel walls, a greater effect may be obtained with repeated operation. Further, as required, if the washing fluid pipe 521 is connected to a water or air supply and the like, then a finishing wash or drying of the tank etc. may also be possible.

With regards to the fluid that has been used for washing, the discharge pipe of the vessel 201 is connected to the discharge pipe 22 on the washing station 13, and the washing fluid is discharged therethrough to outside of the vessel. After completion of discharge, the drive cylinder 503 operates and the support arm 502 is raised, thereby removing the drive shaft 516 and other components from the vessel 201, and the washing operation is completed. At this time, since the brush holder is closed, it is easy to remove the brush and other components from inside of the vessel without touching the walls of the vessel.

If it is necessary to consider safety measures, the spraying of the washing fluid may be performed under predetermined operating conditions as mentioned before, thereby solving the problem of electrostatic generation.

What supplied from the washing fluid pipe have been described in the present embodiment as washing fluids. However they are not limited to washing fluids, and various solvents, gases and the like may be considered as types of fluids for applying to the vessel wall.

Also, in the present embodiment, the description has been concerned with a movable vessel. However, the embodiment is also applicable to the washing of fixed vessels or vessels that may be manually moved.

Further, in the case of high viscosity fluids, it may be possible to fit a scraping plate and the like in place of the brush, so that the scraping out of high viscosity fluids, and washing is possible.

Control of all the operations for the drive source operation, the clockwise and counterclockwise rotation of the drive shaft and rotational speed variation, the washing fluid, the nitrogen gas supply, the discharge piping connection, the washing period, and the truck with movable vessel is performed by a later mentioned control system.

Further, with the present embodiment, the support arm has been explained as moving up and down. However, if another drive source is provided so that the arm can be freely rotated, then vessels located at a plurality of locations may be washed. Furthermore, by having washing equipment such as that with the drive shaft hanging down from one end of the support arm, and equipment having a function different from washing, for example agitation equipment, hanging down from the other end, it may be possible for washing and agitation operations for two vessels to be performed at the same time.

According to the present embodiment, the drive shaft drilled for the washing fluid passage, is freely disposed inside the follower shaft, and the lower end of the follower shaft fits around the drive shaft forming a two fold pipe. The drive arm and the follower arm are substantially perpendicular to the drive shaft and the follower shaft, as is also the second drive arm standingly provided on the rotation pipe which rotates freely about the follower shaft. Furthermore, the brush holder fixed to the brush attachment plate fitted with the brush, is connected to the follower arm so as to turn freely about the connection. The end tip of the beforementioned drive arm fits freely into the elongated slide hole in the lower brush holder. Further, the end tip of the second drive arm fits freely into the elongated slide hole of the upper brush holder so that the respective members are in an engaged condition. On the other hand, the sprocket is fitted to the follower shaft and is connected to the torque keeper and the cam clutch by means of a chain so that when the drive shaft, as a drive source, turns clockwise the cam clutch becomes free. The follower shaft may then rotate together with the drive shaft, and with an increase in rotational speed, the brush holder opens by centrifugal force so that the brush contacts the interior wall of the vessel and thereby cleans the vessel wall.

With counterclockwise rotation of the drive shaft, the clutch locks, and the torque keeper operates thereby braking the follower shaft, so that a difference in rotation between the follower arm and the drive arm occurs and the brush holder closes. The brush holder is thus automatically opened and closed.

Further, by spraying washing fluid from the washing fluid passage drilled in the drive shaft, onto the vessel inner wall from the nozzles, a much greater washing effect can be achieved. By careful consideration of the nozzle position, washing of the vessel wall, and of course washing of the brush itself can be achieved.

As described above, since the brush holder opens and closes automatically, if the vessel is cylindrical in shape, it is possible to wash the vessel even if the internal diameter changes. Since the washing apparatus is inserted and removed from the vessel interior with the brush holder closed, then even if there is some positional misalignment, this can be accommodated so that an efficient washing operation is possible.

The present equipment is not only applicable to movable vessels but may also be used for washing fixed vessels, and the washing of vessels in a multi-purpose production system involving movable vessels may be performed efficiently.

Further, an embodiment of a traverser apparatus of the present invention will be described with reference to the drawings.

Once again referring to FIG. 1, the first guidance track 1 and the second guidance track 1' are provided lying in parallel at a predetermined distance apart, and a plurality of traverse track platforms 2, 2, . . . are provided at substantially perpendicular directions to the first and second guidance tracks 1, 1'. The first and second guidance tracks 1,1' may be connected by means of the traverse track platforms 2, 2. Further, on both sides of the first and second guidance tracks 1, 1' are efficiently arranged a number of stations 11, 12, . . . for management of unit operations. Further, as required, on both sides of the traverse track platforms 2, 2, . . . connecting both guidance tracks 1, 1' are provided separate stations 17, 17', . . . so that while a movable vessel 201 is being traversed, unit operations may be performed. Further, directly above the traverse track platforms 2, 2, . . . are provided fixed equipment so that when a movable vessel is traversed to directly beneath, it is possible to carry out unit operations by connecting piping vertically between the fixed equipment and the movable vessel 201.

Furthermore, the beforementioned traverse track platforms 2, 2, . . . may also be used as waiting stations for the movable vessels 201.

With a movable vessel type multi-purpose batch production system according to the present embodiment, the movable vessel 201 is loaded onto the guided vehicle 100. The guided vehicle 100 then runs, under directions from a central control room, and is positioned to stop in the vicinity of stations 11 to 16. The truck with movable vessel 200 is then transferred to stations 11 to 16 by the transfer equipment 300 provided on the guided vehicle 100, and unit operations are performed on the station platforms.

An embodiment of a traverser apparatus according to the present invention will now be described with reference to FIG. 24, FIG. 25 and FIG. 26.

As beforementioned, with the construction wherein the first guidance track 1 and the second guidance track 1' are provided parallel to each other at a predetermined distance apart, the traverser apparatus may be connected by the traverse track platforms 2, 2, ... arranged substantially perpendicular to the first and second guidance tracks 1, 1'. The truck with movable vessel 200, loaded on the guided vehicle 100 on the first guidance track 1 has the function of traversing to the guided vehicle on the second guidance track 1' by way of the traverse track platform 2. The transfer of the movable vessel 201 from the guided vehicle 100 to the traverse track platform 2 is performed by the transfer equipment 300 loaded on the guided vehicle 100.

Figure 24:
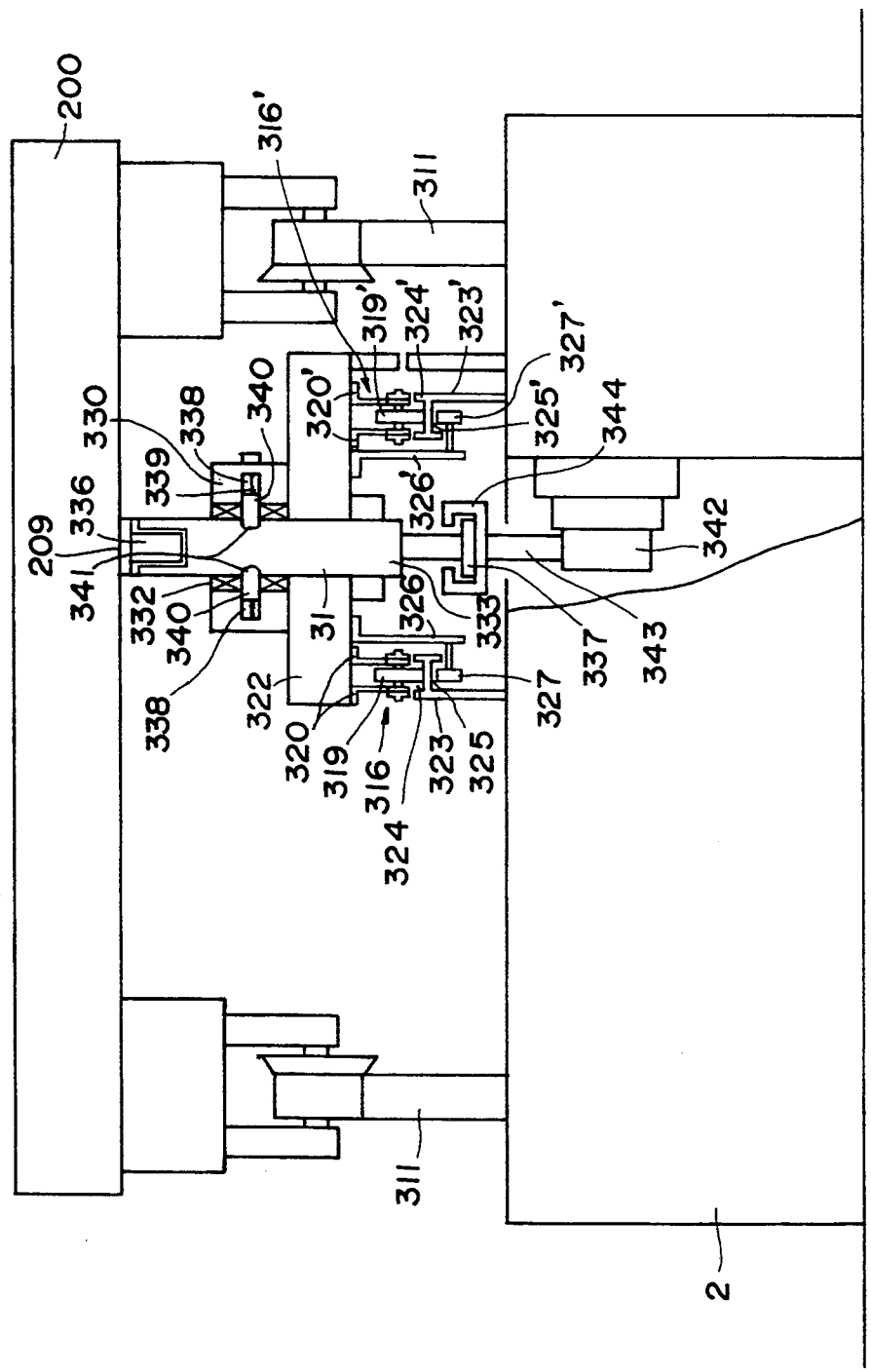
FIG. 24 is an elevation structural diagram showing traverser equipment according to the present invention.
Figure 25:
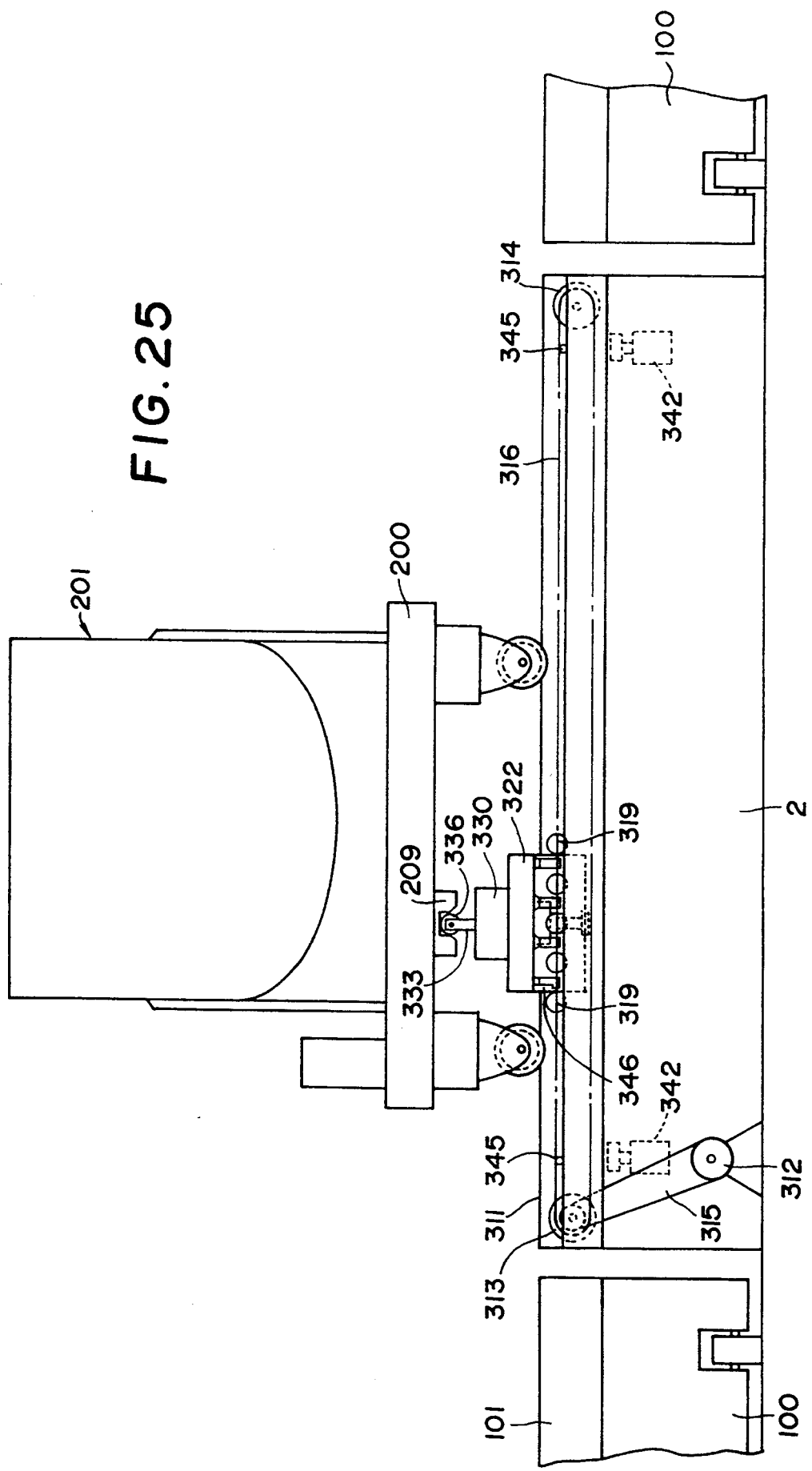
FIG. 25 is a side structural diagram showing the traverser equipment according to the present invention.
Figure 26:
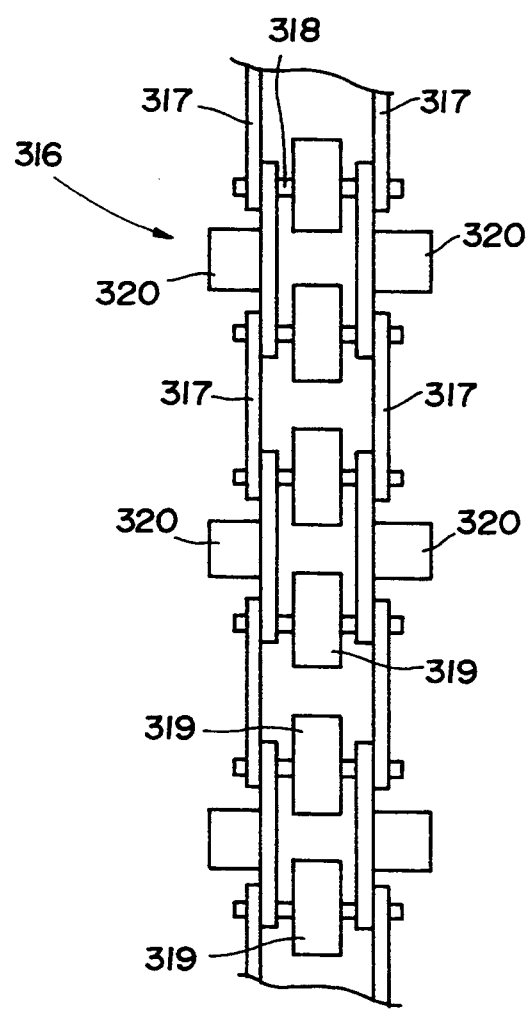
FIG. 26 is a plan view structural diagram showing a drive chain of the traverser equipment.

In FIG. 24 and FIG. 25, in order to avoid complication of the drawing, illustrations related to the transfer equipment have been omitted.

Both ends of the traverse track platforms 2, 2 are located close to the first and second guidance tracks 1,1', and are disposed so there is a small gap between the ends and the guided vehicles 100, 100. The elevation of the traverse track platform 2 is the same as the elevation of guided vehicle 100. The rails 101, 101 for the truck 200 of the movable vessel 201, laid on the guided vehicle 100, and the rails 311, 311 laid in a longitudinal direction on the traverse track platform 2 are both aligned in the same direction.

Item 312 in the drawing is an electric motor disposed at one end of the traverse track platform 2. The electric motor 312 is connected by means of a chain 315 and the like to a sprocket 313 disposed on the end of the traverse track platform 2. Further, a sprocket 314 is disposed on another end of the traverse track platform 2. A chain 316 is provided between and wrapped around the sprockets 313, 314. Further, sprockets 313', 314' are provided at a predetermined distance apart in a widthwise direction of the traverse track platform 2 and on the same axles as the sprockets 313 and 314 respectively. A chain 316' is wrapped around the sprockets 313' and 314'. Accordingly, the chains 316, 316' are disposed parallel to each other in a longitudinal direction of the traverse track platform 2 and are moved at the same speed by means of the electric motor 312.

Chains 316, 316' will now be explained with reference to FIG. 26. Since both chains are of a similar construction, only chain 316 will be described. Chain 316 comprises two link plates 317, 317 connected by a pin 318 which fits freely inside a roller 319. L-shaped attachments 320, 320, ... are fixed to a predetermined number of the link plates 317, 317. Upper end portions of the attachments 320, 320 ... are fixed to a lower portion of a traverse base 322 to be mentioned later. The abovementioned attachments 320, 320, ... are fixed to only those chain link plates 317, 317 that coincide with a length in a longitudinal direction of the traverse base 322.

As shown in FIG. 24, items 323, 323' are roller guides having a cross sectional H-shape disposed in a longitudinal direction on the traverse track platform 2, at a position coinciding with a bottom section of the chains 316, 316'. Rollers 319, 319, ... 319', 319' of the chain 316, 316' fit with space so as to rotate freely in upper groove portions 324, 324' of the H-shaped roller guide 323, so that the traverse base 322 is supported straddling the two parallel chains 316, 316'. As mentioned before, a lower face portion of the traverse base 322 is fixed to the other end of the attachments 320, 320, ... fixed to the plurality of link plates 317, 317, .... Accordingly, the traverse base 322 which follows the movement of the chains 316, 316' is guided by the chain rollers 319, 319', ... 319', 319' ... in the upper grooves 324, 324' of the roller guides 323, 323' and is moved freely.

Rollers 327, 327' are supported on lower end portions of brackets 326, 326' which extend down vertically from a lower face of the traverse base 322. The rollers 327, 327' are inserted with space so as to rotate freely in lower groove portions 325, 325' of the roller guides 323, 323' and prevent side swing and upward float of the traverse base 322 when traversing. Further, so that the rollers 327, 327' may fit freely in the lower grooves 325, 325', a longitudinal groove may be formed for example in one of the walls of the H-shaped roller guide 323, 323', and an axle of the rollers 327, 327' may freely fit into this groove.

A cylindrical shaped housing 330 is fixedly provided on an upper face of the traverse base 322. A through hole 331 is formed in a central portion of the traverse base 322 so as to communicate with an inner cavity of the cylindrical housing 330. A linear bearing 332 is provided on an inner wall of the cylindrical housing 330. An engagement shaft 333 is fitted so as to slide freely vertically passing through the bearing 332 and the through hole 331 of the traverse base 322. Further, to be discussed later, a raising/lowering roller 336 is axially supported on an upper end of the engagement shaft 333 so as to be freely rotatable, and is connectable and disconnectable with a positioning block 209 disposed on the bottom of the truck with movable vessel 200. Also, a stopping claw 337 is fixedly provided on a lower end portion of the engagement shaft 333.

Sockets 338, 338, ... are formed at predetermined angles (for example 120 degrees) around an inner periphery of the cylindrical housing 330. Plungers 340, 340, ... connected to springs 339, 339 are disposed at bottom portions of the sockets 338, 338.

Concavities 341, 341, ... are drilled in the shaft 333 in a position which corresponds to the plungers 340, 340, ... housed in the sockets 338, 338, ... drilled in the cylindrical housing 330, at a time when the engagement shaft 333 is raised and the raising/lowering roller 336 at the end thereof is engaged with the positioning block 209 formed with a ridge shaped concavity and fixedly disposed on the bottom of the truck 200 of the movable vessel.

Further, cylinders 342, 342 are provided at both end portions in a longitudinal direction of the traverse track platform 2 (only one cylinder is shown in the diagram). A receiving block 344 is provided at an end of a piston rod 343 of the cylinder 342, for engaging with the stopping claw 337 at the lower end of the engagement shaft 333. The cylinder 342 is operated with the stopping claw 337 engaged with the receiving block 344, and by raising and lowering the receiving block 344, the engagement shaft 333 is moved up and down by mean of the stopping claw 337.

Further, as mentioned before, with the raising of the engagement shaft 333 passing through the traverse base 322 and the cylindrical housing 330 mounted on the traverse base 322, the raising/lowering roller 336 at the end tip of the engagement shaft 333 engages with the positioning block 209 fixedly provided at the bottom of the truck with movable vessel 200. At this time the plungers 340, 340, . . . provided in the sockets 338, 338, . . . drilled around a periphery of the cylindrical housing 330, are inserted in the concavities 341, 341, . . . disposed around an outer periphery of the engagement shaft 333, under the urging force of springs 339, 339, . . . . As a result, the engagement shaft 333 becomes engaged with the cylindrical housing 330 so that the engagement shaft 333 is kept from moving vertically.

Further, as shown in FIG. 25, item 345 is a limit switch provided on the traverse track platform 2 and item 346 is a limit switch detection block fixed to a lower face of the traverse base 322 so as to extend downwards. By means of the limit switch 345 and the limit switch detection block 346, the traverse base 322 may be accurately positioned at a predetermined position.

As mentioned before, the cylinders 342 for raising and lowering the engagement shaft 333 are provided at both end portions in a longitudinal direction, of the traverse platform 2. In the case of positioning, the receiving block 344 is positioned directly beneath the positioning block 209 fixed to the bottom of the truck 200 of the movable vessel 201, when the truck 200 is positioned for transfer or return of the movable vessel 201 from the guided vehicle 100 to the traverse track platform 2 by the transfer equipment 300. At this position the receiving block 344 and the stopping claw 337 are engaged. Furthermore, the raising/lowering roller 336 and the positioning block 209 are set so as to engage.

The traverser equipment of the present invention is constructed as above. That is to say, with the traverser equipment, when the first guidance track 1 and the second guidance track 1' are arranged in parallel at a predetermined spacing, they may be connected by the traverse track platforms 2, 2, . . . provided at a substantially perpendicular direction to the guidance tracks 1, 1'. The movable vessel 201 loaded on the guided vehicle 100 on the first guidance track 1 may be transferred to the guided vehicle 100 on the second guidance track 1' by way of the traverse track platform 2, and an operation performed at the station on the second guidance track 1' side. In traversing with this type of traverse track platform 2, at first it is necessary to transfer the movable vessel 201 of the guided vehicle 100 to the traverse platform 2. At the time of this transfer it is possible to use any type of suitable transfer equipment, although transfer equipment carried on the guided vehicle is preferable.

With the traverser equipment for the movable vessel according to the present embodiment, in a movable vessel type multi-purpose batch system, for example one wherein parallel guidance tracks are provided on one side with a multiplicity of stations provided on both sides thereof, by providing a traverse track platform substantially perpendicular to the guidance track, the truck with movable vessel may be easily transferred from the guided vehicle on the guidance track on the one side to another guided vehicle standing by on another guidance track. Accordingly, the guided vehicle may be effectively utilized, and the truck with movable vessel 200 may be moved to all of the stations. Further, with the provision of additional guidance tracks, then by providing traverse track platforms perpendicular thereto, a much greater increase in utilization is possible and an increase in production may be easily accommodated.

Further, at a separate station on the traverse track platform 2, or with various types of fixed equipment provided directly above the traverse track platform 2, by having a device for connecting with the fixed equipment and movable vessel in a horizontal or vertical direction, the truck with movable vessel may perform the necessary unit operation while traversing from one guidance track to another guidance track. Also, as required, the traverse track platform may be utilized as a standby location for the truck with movable vessel so that the factory site may be utilized to its maximum limits. In this case, the traverse track platform takes on a wider meaning and a complete change in station format may be envisioned.

Depending on requirements, if the traverse platform is able to move between two main guidance tracks, then traverse from one main guidance track station to the other main guidance track station is possible. The traverser equipment according to the present embodiment therefore makes it possible to broadly accommodate multi-purpose production equipment involving movable vessels.

The operation of the above described transfer equipment, automatic connecting equipment, washing equipment and traverser equipment, as well as operation of the stations and guided vehicles, may be performed manually when required. However it may be preferable to integrate all the operations depending on the control equipment and perform the operation automatically.

Figure 27:
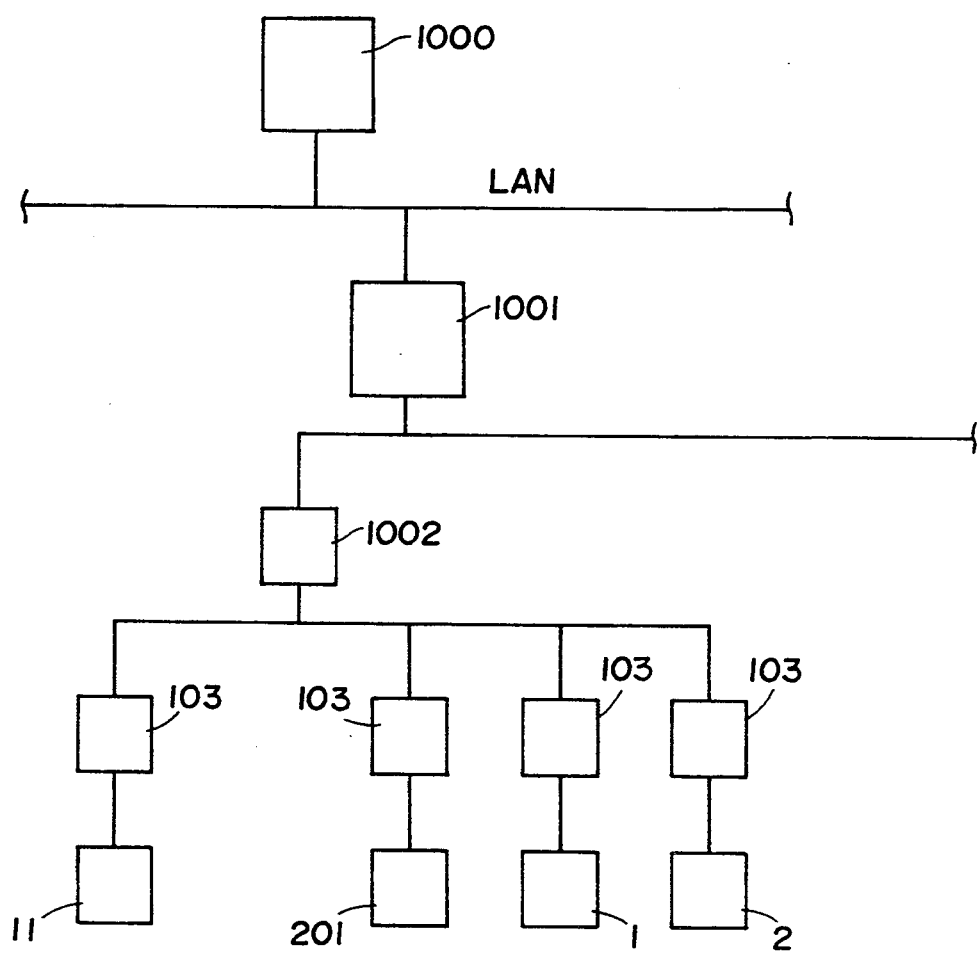
FIG. 27 is a block diagram explaining a control unit for automatic control of all operations of the present invention system.

FIG. 27 gives an example of this type of control equipment and control system. The control system has a production management computer 1001 having a production scheduling function and performing the complete production control. A Fuji Electric Company Limited FMR-70 may be used as the production management computer 1001. A process control computer 1002 comes under the production management computer 1001. This may also be an FMR-70. A number of local control computers 1003 are positioned under the process control computer 1002 through a control LAN. By means of these local control computers 1003, the various operation commands such as drive, stop and connection for the stations, guided vehicles, transfer equipment, automatic connection equipment, washing equipment and traverser equipment may be performed. Also information generated during the operations may be collected and analyzed. The local control computers 1003 may be for example, Fuji Electric Co. Ltd. model PLC-F250 types. The production management computer 1001 at the top of the control system is normally controlled by a plant management computer 1000 which controls production over the entire plant by way of a factory LAN.

In the present invention a guidance track with rails has been shown to represent the guidance course. However, the guidance course is not limited to the rail type and other forms of guidance course such as a paved path may be possible.

INDUSTRIAL APPLICABILITY

The movable vessel type multi-purpose batch production system according to the present invention is based on a "not using piping, moving reaction vessel" concept. With this system the problems in conventional batch processing systems such as with contamination, difficulty in washing, problems with equipment for handling the complicated operation of changing products, problems with product quality of high purity products, problems with production efficiency, and difficulties related to automation of piping change and product type change may all be solved. Piping, measuring equipment and pumping equipment may all be minimized, and production efficiency may be greatly improved, so that product quality improvement and automation that has not been possible to achieve with conventional technology becomes possible. The movable vessels throughout the system may be used efficiently, and efficiencies in the side of practical use and administration can be greatly increased. Therefore, the system according to the present invention is a very progressive production system not existing with conventional systems.

Further, with the transfer equipment in the present invention, it is possible to transfer the movable vessel from the guided vehicle to the station platform and return it from the station platform to the guided vehicle at will. If the transfer equipment is carried on the guided vehicle, special equipment is not required at each station. There are also other advantages such as, not so much space will be taken up, the gap between the station and the guidance track may be greatly reduced, the motive power may be concentrated in the transfer equipment, the mechanism is simplified, the movable vessel may be smoothly transferred to the stations on both the right side and left side of the guidance track, the operating efficiency of the guided vehicle may be improved, and highly efficient multi-purpose production is possible. Further, with the automatic connection equipment of the present invention in a movable vessel type multi-purpose batch production system, it is possible for the movable vessel to carry various types of machinery, and electrical equipment, and even with processes involving the handling of dangerous goods the process is not subject to special limitations. As well as this, any positional misalignment in the X, Y, Z directions may be fully accommodated, and power source and fluid connections between the fixed equipment on the station, and the truck with movable vessel may be easily and positively as well as rapidly performed.

Further, with the washing equipment for the movable vessel according to the present invention in a movable vessel type multi-purpose batch production system, the washing of the vessel, indispensable for multi-product small quantity variable amount production, may be performed easily. As a result, contamination may be completely avoided. Further, with the washing equipment of the present invention, since this involves a construction wherein the brush holder is automatically opened and closed, then in the case of a cylindrical tank, washing is possible even if the tank diameter changes. Further, since the washing equipment is fitted and removed from the vessel interior with the brush holder closed, then even if somewhat positional misalignment of the tank accommodate, an efficient washing operation is possible.

Also, with the washing equipment of the present invention, a washing fluid passage is provided in the drive shaft and a plurality of nozzles are fixed to an end of a discharge pipe connected to this passage. The washing fluid is sprayed from the nozzles, so that the tank interior as well as the brush itself may be washed.

Further, with the movable vessel traverser equipment according to the present invention, the movable vessel may be moved to any station so that movable vessel type batch systems may be broadly accommodated.

We claim:

1. A movable vessel type multi-purpose batch production system which comprises:
    a plurality of station means for performing respective unit operations a guidance course;
    a guided vehicle means for moving along said guidance course between said plurality of station means;
    a movable vessel mounted on said guided vehicle means, said movable vessel being moved between said plurality of station means; and
    transfer means for transferring said movable vessel from said guided vehicle means to each of said station means and for returning said movable vessel from each of said station means to said guided vehicle means, wherein
    said transfer means comprises a first drive arm, a second drive arm movably supported by said first drive arm, first drive means for driving said first drive arm to extend and retract said first drive arm, second drive means for driving said second drive arm to extend and retract said second drive arm relative to said first arm, said first and second drive arms and said first and second drive means provided on said guided vehicle means, and engagement means provided on said movable vessel for engaging with said second drive arm, said movable vessel being transferred from said guided vehicle means to each of said station means by extensions of said first and second drive arms, and said movable vessel being returned from each of said station means to said guided vehicle means by retractions of said first and second drive arm.

2. A movable vessel type multi-purpose batch production system as claimed in claim 1, which further comprises control means for controlling the operation of each of said station means, said movable vessel, said guided vehicle means, and said transfer means.

3. A movable vessel type multi-purpose batch production system as claimed in claim 1, wherein each of said station means includes a power supply means and a fluid supply means, and said movable vessel includes power receiving means and fluid receiving means, said system further comprising automatic connecting means for automatically connecting said power supply means and said fluid supply means at each of said station means to said power receiving means and said fluid receiving means of said movable vessel, after said movable vessel has been transferred to one of said station means,
    said automatic connecting means comprising,
    a first table provided on said movable vessel, and a second table provided on said one of said station means, a receptacle means provided on one of said first table and said second table for alignment thereof, and a connecting means provided on one of said second table and said first table for alignment thereof and for connection to said receptacle means, wherein
    said power receiving means and said fluid receiving means are provided on said first table and said power supply means and said fluid supply means are provided on said second table, wherein said system further comprises
    a first adjusting means for adjusting at least one of said first and second tables in a plane perpendicular to a direction of connection between said power supply means and said fluid supply means, and said power receiving means and said fluid receiving means, a second adjusting means for adjusting at least one of said first and second tables in a direction parallel to said connection direction, and means for tilting at least one of said first and second tables about said perpendicular plane.

4. A movable vessel type multi-purpose batch production system as claimed in claim 3, which further comprises control means for controlling the operation of each of said station means, said movable vessel, said guided vehicle means, said transfer means and said automatic connecting means.

5. A movable vessel type multi-purpose batch production system as claimed in claim 3 which further comprises washing means for washing said movable vessel after discharge of contents of said movable vessel on completion of one of said unit operations, said washing means comprising,
a drive shaft provided with a washing fluid passage internally formed in a longitudinal direction of said drive shaft,
a follower shaft fitted externally to said drive shaft so as to rotate about said drive shaft,
a drive arm provided on said drive shaft,
a follower arm provided on said follower shaft, and
a brush holder linked to said follower arm so as to turn about said follower arm, an end of said drive arm being slidably fitted in said brush holder, said drive arm and said follower arm being constructed and arranged such that,
when an angular difference between said drive arm and said follower arm changes in accordance with an increase or decrease in rotation of said drive shaft, said brush holder automatically extends or retracts respectively, and washing fluid from said washing fluid passage inside said drive shaft is sprayed outward from said drive shaft.

6. A movable vessel type multi-purpose batch production system as claimed in claim 5, which further comprises control means for controlling the operation of each of said station means, said movable vessel, said guided vehicle means, said transfer means, said automatic connecting means and said washing means.

7. A movable vessel type multi-purpose batch production system as claimed in claim 3, wherein said guidance course includes first and second guidance courses, and said system further comprises traverser means for traversing said movable vessel from said first guidance course to said second guidance course, said traverser means comprising,
a traverse platform disposed between said first guidance course and said second guidance course,
a traverse base provided on said traverse platform so as to be movable back and forth in a longitudinal direction of said traverse platform,
means for pulling said traverse base back and forth in said longitudinal direction of said traverse platform, and
a connecting and disconnecting means for connecting and disconnecting said movable vessel on said guided vehicle means to and from said traverse base, and constructed and arranged such that,
when said traverse base and said movable vessel are connected by said connecting and disconnecting means, said movable vessel is traversed onto said traverse platform by drive of said pulling means acting through said traverse base.

8. A movable vessel type multi-purpose batch production system as claimed in claim 7, which further comprises control means for controlling the operation of each of said station means, said movable vessel, said guided vehicle means, said transfer means, said automatic connecting means and said traverser means.

9. A movable vessel type multi-purpose batch production system as claimed in claim 5, wherein said guidance course includes first and second guidance courses, and said system further comprises traverser means for traversing said movable vessel from said first guidance course to said second guidance course, said traverser means comprising,
a traverse platform disposed between said first guidance course and said second guidance course,
a traverse base provided on said traverse platform so as to be movable back and forth in a longitudinal direction of said traverse platform,
means for pulling said traverse base back and forth in said longitudinal direction of said traverse platform, and
a connecting and disconnecting means for connecting and disconnecting said movable vessel on said guided vehicle means to and from said traverse base, and constructed and arranged such that,
when said traverse base and said movable vessel are connected by said connecting and disconnecting means, said movable vessel is traversed onto said traverse platform by drive of said pulling means acting through said traverse base.

10. A movable vessel type multi-purpose batch production system as claimed in claim 9, which further comprises control means for controlling the operation of each of said station means, said movable vessel, said guided vehicle means, said transfer means, said automatic connecting means, said washing means and said traverser means.

11. A movable vessel type multi-purpose batch production system as claimed in claim 1 which further comprises washing means for washing said movable vessel after discharge of contents of said movable vessel on completion of one of said unit operations, said washing means comprising,
a drive shaft provided with a washing fluid passage internally formed in a longitudinal direction of said drive shaft,
a follower shaft fitted externally to said drive shaft so as to rotate about said drive shaft,
a drive arm provided on said drive shaft,
a follower arm provided on said follower shaft, and
a brush holder linked to said follower arm so as to turn about said follower arm, an end of said drive arm being slidably fitted in said brush holder, said drive arm and said follower arm being constructed and arranged such that,
when an angular difference between said drive arm and said follower arm changes in accordance with an increase or decrease in rotation of said drive shaft, said brush holder automatically extends or retracts respectively, and washing fluid from said washing fluid passage inside said drive shaft is sprayed outward from said drive shaft.

12. A movable vessel type multi-purpose batch production system as claimed in claim 11 which further comprises control means for controlling the operation of each of said station means, said movable vessel, said guided vehicle means, said transfer means and said washing means.

13. A movable vessel type multi-purpose batch production system as claimed in claim 11, wherein said guidance course includes first and second guidance courses, and said system further comprises traverser means for traversing said movable vessel from said first guidance course to said second guidance course, said traverser means comprising, a traverse platform disposed between said first guidance course and said second guidance course, a traverse base provided on said traverse platform so as to be movable back and forth in a longitudinal direction of said traverse platform, means for pulling said traverse base back and forth in said longitudinal direction of said traverse platform, and a connecting and disconnecting means for connecting and disconnecting said movable vessel on said guided vehicle means to and from said traverse base, and constructed and arranged such that, when said traverse base and said movable vessel are connected by said connecting and disconnecting means, said movable vessel is traversed onto said traverse platform by drive of said pulling means acting through said traverse base.

14. A movable vessel type multi-purpose batch production system as claimed in claim 13, which further comprises control means for controlling the operation of each of said station means, said movable vessel, said guided vehicle means, said transfer means, said washing means and said traverser means.

15. A movable vessel type multi-purpose batch production system as claimed in claim 1, wherein said guidance course includes first and second guidance courses, and said system further comprises traverser means for traversing said movable vessel from saod first guidance course to said second guidance course, said traverser means comprising, a traverse platform disposed between said first guidance course and said second guidance course, a traverse base provided on said traverse platform so as to be movable back and forth in a longitudinal direction of said traverse platform, means for pulling said traverse base back and forth in said longitudinal direction of said traverse platform, and a connecting and disconnecting means for connecting and disconnecting said movable vessel on said guided vehicle means to and from said traverse base, and constructed and arranged such that, when said traverse base and said movable vessel are connected by said connecting and disconnecting means, said movable vessel is traversed onto said traverse platform by drive of said pulling means acting through said traverse base.

16. A movable vessel type multi-purpose batch production system as claimed in claim 15, which further comprises control means for controlling the operation of each of said station means, said movable vessel, said guided vehicle means, said transfer means and said traverser means.

17. A movable vessel type multi-purpose batch production system which comprises:

a plurality of station means for performing respective unit operations, at least one of said station means including a power supply means and a fluid supply means; a guidance course;

a guided vehicle means for moving along said guidance course between said plurality of station means;

a movable vessel mounted on said guided vehicle means, said movable vessel being moved between said plurality of station means, and said movable vessel including power receiving means and fluid receiving means; and automatic connecting means for automatically connecting said power supply means and said fluid supply means at each of said station means to said power receiving means and said fluid receiving means of said movable vessel, after said movable vessel has been transferred to one of said station means;

said automatic connecting means comprising, a first table provided on said movable vessel, and a second table provided on said one of said station means, a receptacle means provided on one of said first table and said second table for alignment thereof, and a connecting means provided on one of said second table and said first table for alignment thereof and for connection to said receptacle means, wherein said power receiving means and said fluid receiving means are provided on said first table and, said power supply means and said fluid supply means are provided on said second table, wherein said system further comprises a first adjusting means for adjusting at least one of said first and second tables in a first direction perpendicular to a direction of connection between said power supply means and said fluid supply means, and said power receiving means and said fluid receiving means, a second adjusting means for adjusting at least one of said first and second tables in a second direction perpendicular to both said first direction and said connection direction, and means for tilting at least one of said first and second tables about a plane defined by said first and second directions.

18. A movable vessel type multi-purpose batch production system as claimed in claim 17, which further comprises control means for controlling the operation of each of said station means, said movable vessel, said guided vehicle means and said automatic connecting means.

19. A movable vessel type multi-purpose batch production system as claimed in claim 17, wherein said guidance course includes first and second guidance courses, and said system further comprises washing means for washing said movable vessel after discharge of contents of said movable vessel on completion of one of said unit operations, and traverser means for traversing said movable vessel from said first guidance course to said second guidance course, wherein said washing means comprises, a drive shaft provided with a washing fluid passage internally formed in a longitudinal direction of said drive shaft, a follower shaft fitted externally to said drive shaft so as to rotate about said drive shaft, a drive arm provided on said drive shaft, a follower arm provided on said follower shaft, and a brush holder linked to said follower arm so as to turn about said follower arm, an end of said drive arm being slidably fitted in said brush holder, said drive arm and said follower arm being constructed and arranged such that, when an angular difference between said drive arm and said follower arm changes in accordance with an increase or decrease in rotation of said drive shaft, said brush holder automatically extends or retracts respectively, and washing fluid from said washing fluid passage inside said drive shaft is sprayed outward from said drive shaft, and said traverser means comprises, a traverse platform disposed between said first guidance course and said second guidance course, a traverse base provided on said traverse platform so as to be movable back and forth in a longitudinal direction of said traverse platform, means for pulling said traverse base back and forth in said longitudinal direction of said traverse platform, and a connecting and disconnecting means for connecting and disconnecting said movable vessel on said guided vehicle means to and from said traverse base, and constructed and arranged such that, when said traverse base and said movable vessel are connected by said connecting and disconnecting means, said movable vessel is traversed onto said traverse platform by drive of said pulling means acting through said traverse base.

20. A movable vessel type multi-purpose batch production system as claimed in claim 19, which further comprises control means for controlling the operation of each of said station means, said movable vessel, said guided vehicle means, said automatic connecting means, said washing means and said traverser means.

21. A movable vessel type multi-purpose batch production system which comprises:

a plurality of station means for performing respective unit operations; a guidance course;

a guided vehicle means for moving along said guidance course between said plurality of station means;

a movable vessel mounted on said guided vehicle means, said movable vessel being moved between said plurality of station means; and washing means for washing said movable vessel after discharge of contents of said movable vessel on completion of one of said unit operations, said washing means comprising, a drive shaft provided with a washing fluid passage internally formed in a longitudinal direction of said drive shaft, a follower shaft fitted externally to said drive shaft so as to rotate about said drive shaft, a drive arm provided on said drive shaft, a follower arm provided on said follower shaft, and a brush holder linked to said follower arm so as to turn about said follower arm, an end of said drive arm being slidably fitted in said brush holder, said drive arm and said follower arm being constructed and arranged such that, when an angular difference between said drive arm and said follower arm changes in accordance with an increase or decrease in rotation of said drive shaft, said brush holder automatically extends or retracts respectively, and washing fluid from said washing fluid passage inside said drive shaft is sprayed outward from said drive shaft.

22. A movable vessel type multi-purpose batch production system as claimed in claim 21, which further comprises control means for controlling the operation of each of said station means, said movable vessel, said guided vehicle means, and said washing means.

* * * * *

UNITED STATES PATENT AND TRADEMARK OFFICE
CERTIFICATE OF CORRECTION

PATENT NO. : 5,354,542
DATED : October 11, 1994
INVENTOR(S) : Kazuo TANAKA et al.

It is certified that error appears in the above-indentified patent and that said Letters Patent is hereby corrected as shown below:

Claim 1, column 32, line 4 after "operations" insert --;-- and make a new, single-indent line with "a guidance course;".

Claim 15, column 35, line 34 change "saod" to --said--.

Claim 17, column 35, line 65 make a new, single-indent line with "a guidance course;".

Claim 21, column 37, penultimate line make a new single-indent line with "a guidance course;".

Signed and Sealed this

Twenty-third Day of May, 1995

Attest:

BRUCE LEHMAN

Attesting Officer

Commissioner of Patents and Trademarks